United States Patent
Karaki et al.

(10) Patent No.: US 11,539,472 B2
(45) Date of Patent: Dec. 27, 2022

(54) METHODS AND APPARATUSES FOR HYBRID AUTOMATIC REPEAT REQUEST (HARQ)

(71) Applicant: Telefonaktiebolaget LM Ericsson (publ), Stockholm (SE)

(72) Inventors: Reem Karaki, Aachen (DE); Havish Koorapaty, Saratoga, CA (US); Jung-Fu Cheng, Fremont, CA (US); Gen Li, Beijing (CN); Stephen Grant, Pleasanton, CA (US); Daniel Chen Larsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/053,300

(22) PCT Filed: May 9, 2019

(86) PCT No.: PCT/SE2019/050413
§ 371 (c)(1),
(2) Date: Nov. 5, 2020

(87) PCT Pub. No.: WO2019/216816
PCT Pub. Date: Nov. 14, 2019

(65) Prior Publication Data
US 2021/0167900 A1 Jun. 3, 2021

Related U.S. Application Data

(60) Provisional application No. 62/669,641, filed on May 10, 2018.

(51) Int. Cl.
*H04W 4/00* (2018.01)
*H04L 1/18* (2006.01)
(Continued)

(52) U.S. Cl.
CPC .......... *H04L 1/1819* (2013.01); *H04L 5/0055* (2013.01); *H04W 72/042* (2013.01); *H04W 72/0446* (2013.01); *H04W 72/0453* (2013.01)

(58) Field of Classification Search
CPC ... H04L 1/1819; H04L 5/0055; H04L 1/1854; H04L 1/1822; H04L 1/1685;
(Continued)

(56) References Cited

U.S. PATENT DOCUMENTS

2017/0273056 A1* 9/2017 Papasakellariou .. H04W 52/143
2018/0123744 A1* 5/2018 Nogami ................ H04L 1/1854
(Continued)

FOREIGN PATENT DOCUMENTS

WO 2017214612 A1 12/2017

OTHER PUBLICATIONS

Japanese Office Action with English Summary Translation dated Feb. 1, 2022 for Patent Application No. 2020-562141, consisting of 8-pages.
(Continued)

*Primary Examiner* — Mang Hang Yeung
(74) *Attorney, Agent, or Firm* — Christopher & Weisberg, P.A.

(57) ABSTRACT

Methods and apparatuses are disclosed for Hybrid Automatic Repeat reQuest Acknowledgement, HARQ-ACK, feedback. In one embodiment, a method implemented in a wireless device, WD, includes receiving, from a network node, a first Downlink Control Information, DCI, scheduling a physical downlink shared channel, PDSCH, and receiving, from the network node, a second DCI, the second DCI comprising a HARQ-ACK feedback request trigger triggering a HARQ-ACK feedback for the PDSCH scheduled by the first DCI. In another embodiment, a method implemented in a network node includes transmitting a first
(Continued)

---

Determine scheduling for a physical downlink shared channel, PDSCH
S134

↓

Transmit a first Downlink Control Information, DCI, scheduling the PDSCH
S136

↓

Transmit a second DCI, the second DCI comprising a Hybrid Automatic Repeat reQuest Acknowledgement, HARQ-ACK, feedback request trigger triggering a HARQ-ACK feedback for the PDSCH scheduled by the first DCI
S138

Downlink Control Information, DCI, scheduling the PDSCH, and transmitting a second DCI, the second DCI having a HARQ-ACK feedback request trigger triggering a HARQ-ACK feedback for the PDSCH scheduled by the first DCI.

23 Claims, 13 Drawing Sheets

(51) Int. Cl.
*H04L 5/00* (2006.01)
*H04W 72/04* (2009.01)

(58) Field of Classification Search
CPC ........... H04W 72/042; H04W 72/0446; H04W 72/0453; H04W 72/1273; H04W 72/1289; H04W 74/0808
USPC ........................................................ 370/329
See application file for complete search history.

(56) References Cited

U.S. PATENT DOCUMENTS

2018/0310257 A1* 10/2018 Papasakellariou .... H04W 52/50
2019/0306878 A1* 10/2019 Zhang ................... H04W 72/14

OTHER PUBLICATIONS

3gpp TSG RAN WG1 Meeting #85 R1-165182; Title: Discussion on affinity for unlicensed spectrum access in 5G new radio; Agenda Item: 7.1.7; Source: NTT Docomo, Inc.; Document for: Discussion and Decision; Date and Location: May 23-27, 2016, Nanjing, China, consisting of 5-pages.
International Search Report and Written Opinion dated Apr. 16, 2020 for International Application No. PCT/SE2019/050413 filed on May 9, 2019, consisting of 17-pages.
3GPP TSG RAN WG1 Meeting #85 R1-164941; Title: eLAA UL scheduling / UL grant details; Agenda Item: 6.2.1.1; Source: Nokia, Alcatel-Lucent Shanghai Bell; Document for: Discussion and Decision; Date and Location: May 23-27, 2016, Nanjing, China, consisting of 9-pages.
3GPP TSG-RAN WG2 Meeting #101 bis R2-1804825; Title: Scheduling enhancements for NR-based access to unlicensed spectrum; Agenda Item: 11.2; Source: InterDigital Inc. Document for: Discussion, Decision; Date and Location: Apr. 16-20, 2018, Sanya, China, consisting of 3-pages.
European Communication dated Jun. 8, 2022 for Application No. 19725431.1, consisting 6 pages.
3GPP TSG RAN WG1 Meeting #92bis R1-1804275; Title: Frame structure for NR-U operation; Agenda item: 7.6.2; Source: Nokia, Nokia Shanghai Bell; Document for: Discussion and Decision; Location and Date: Sanya, P.R. China, Apr. 16-20, 2018, consisting of 5 pages.
3GPP TSG RAN WG1 Meeting #92bis R1-1804768; Title: NR Unlicensed Physical Channel Design Considerations; Agenda Item: 7.6.3; Source: Apple Inc.; Document for: Discussion/Decision; Location and Date: Sanya, China, Apr. 16-20, 2018, consisting of 6 pages.
3GPP TSG RAN WG1 Meeting #92bis R1-1804582; Title: Physical layer procedures for NR unlicensed operation; Agenda Item: 7.6.4; Document for: Discussion and decision; Location and Date: Sanya, China, Apr. 16-20, 2018, consisting of 5 pages.
3GPP TSG RAN WG1 Meeting #92bis R1-1804277; Title: Physical layer procedure enhancements for NR unlicensed; Agenda item: 7.6.4; Source: Nokia, Nokia Shanghai Bell; Document for: Discussion and Decision; Location and Date: Sanya, China, Apr. 16-20, 2018, consisting of 5 pages.
Korean Office Action and English Summary dated Sep. 21, 2022 for Application No. 20207034384, consisting of 8 pages.
3GPP TSG RAN WG1 Meeting #92 R1-1802533; Title: on AUL Channel Access; Source; Ericsson; Agenda Item: 6.2.2.2.3; Document for: Discussion and Decision; Location and Date: Athens, Greece, Feb. 26-Mar. 2, 2018, consisting of 6 pages.

* cited by examiner

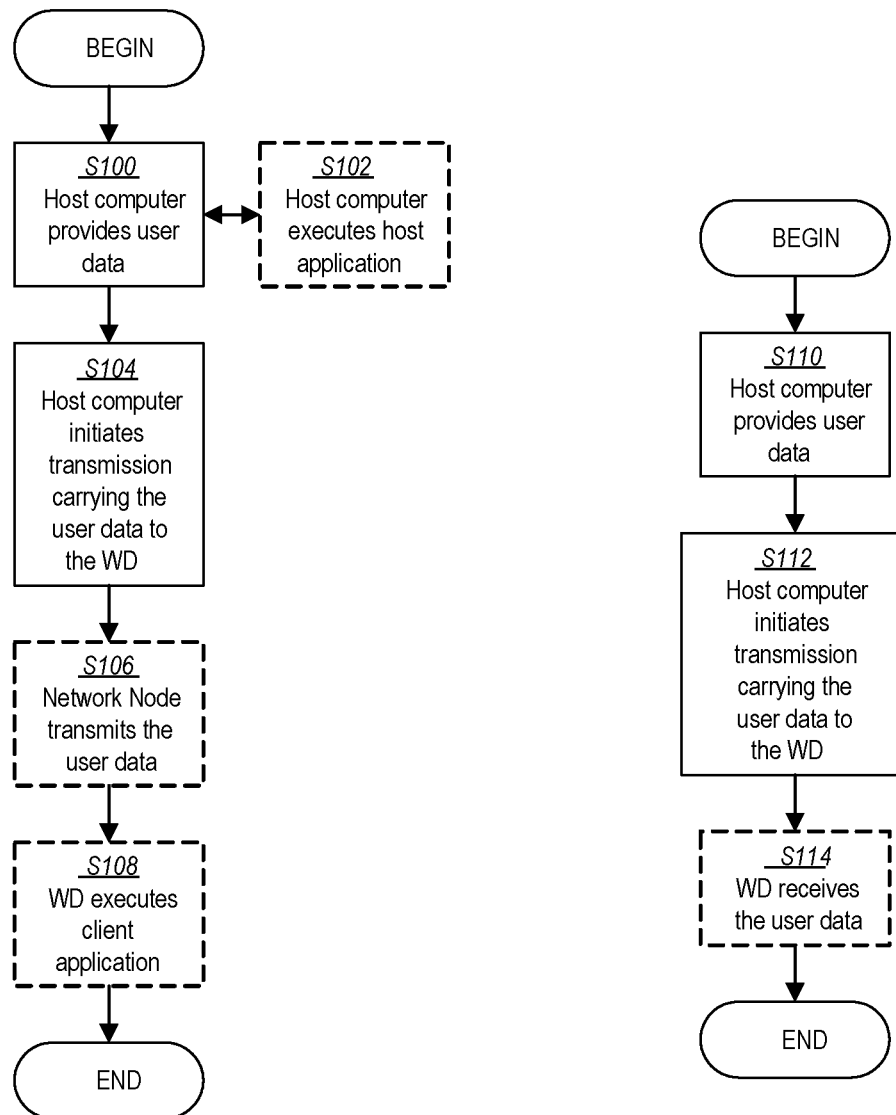

Receive, from a network node, a first Downlink Control Information, DCI, scheduling a physical downlink shared channel, PDSCH
S144

Receive, from the network node, a second DCI, the second DCI comprising a Hybrid Automatic Repeat reQuest Acknowledgement, HARQ-ACK, feedback request trigger triggering a HARQ-ACK feedback for the PDSCH scheduled by the first DCI
S146

Responsive to the HARQ-ACK feedback request trigger, transmit the HARQ-ACK feedback for the PDSCH scheduled by the first DCI
S147

FIG. 11

Receive a Hybrid Automatic Repeat reQuest Acknowledgement, HARQ-ACK, feedback request for a scheduled physical downlink shared channel, PDSCH
S148

Responsive to the received HARQ-ACK feedback request, communicate a HARQ-ACK feedback based at least in part on a size of a gap between an end of the PDSCH and a first uplink, UL, channel scheduled after the PDSCH
S150

FIG. 12

METHODS AND APPARATUSES FOR HYBRID AUTOMATIC REPEAT REQUEST (HARQ)

CROSS-REFERENCE TO RELATED APPLICATIONS

This application is a Submission Under 35 U.S.C. § 371 for U.S. National Stage Patent Application of International Application No.: PCT/SE2019/050413, filed May 9, 2019 entitled "METHODS AND APPARATUS FOR HYBRID AUTOMATIC REPEAT REQUEST (HARQ)," which claims priority to U.S. Provisional Application No. 62/669,641, filed May 10, 2018 entitled "METHODS AND APPARATUSES FOR HYBRID AUTOMATIC REPEAT REQUEST (HARQ)", the entireties of both of which are incorporated herein by reference.

TECHNICAL FIELD

Wireless communication and in particular, to methods and apparatuses for Hybrid Automatic Repeat reQuest (HARQ).

BACKGROUND

HARQ is an error detection and correcting technique employed in certain types of wireless communications. New Radio (NR), also referred to as 5G, may provide the flexibility in HARQ feedback timing to account for dynamic Time Division Duplex (TDD) and also a possibly to combine several HARQ feedbacks for both lower overhead and higher reliability. FIG. 1 shows such an example. The slot timing (which may be denoted as K1) between downlink (DL), i.e., from the network node to the wireless device, data transmission and acknowledgement is determined based on a 3-bit field in Downlink Control Information (DCI). Radio Resource Signaling (RRC) configures the set of 8 values to be indexed by K1 (possible value range include {0, 1, . . . , 15}).

NR may provide the flexibility to include aggregate feedback corresponding to multiple HARQ processes in one Physical Uplink Control Channel (PUCCH)/UCI transmission by means of semi-static and dynamic code block.

Semi-Static HARQ Codebook

HARQ codebook size in time (DL association set) is determined based on, for example, a configured set of HARQ-ACK timings K1, Physical Downlink Control Channel (PDCCH) monitoring occasions, and semi-static configured TDD pattern. For each slot, a user equipment (UE) or wireless device (WD) may report a HARQ feedback bitmap of fixed size according to its Carrier Aggregation (CA) and Transport Block/Code Block Group (TB/CBG) configuration (in this example 7 bit). Non-received TB/CBG are set to NACK.

Dynamic HARQ Codebook

Dynamic HARQ codebook can provide the possibility to dynamically determine the set of HARQ processes for which the HARQ feedback should be reported. The DCI can include: a DL assignment indicator that indicates the number of HARQ process that should reported, and Physical Downlink Shared Channel (PDSCH) to HARQ-ACK timing that specifies the time resource in which the network node (e.g., eNB) is expecting the feedback.

Downlink Assignment Index (DAI) Computation for Dynamic HARQ Codebook

The WD may refer to the DAI value to calculate the dynamic codebook size. For every PDSCH transmission, the DAI value in the DCI may be incremented. The DAI in the DL scheduling DCI may be stepped up by one as compared to the immediately preceding DL scheduling DCI. If this does not occur, it is an indication that PDSCH transmission(s) has been missed. The difference between the two received DAI values at the WD in current and earlier DCI indicates how many PDSCH transmissions were missed.

DAI may indicate the number of HARQ process that should reported. However, the DAI value in other standards, e.g., NR rel-15, is only 2-bits (representing 4 possible values 0, 1, 2, 3), after reaching the highest DAI value (i.e., 3), the DAI is wrap around and starts again from the smallest value, as shown, for example, FIG. 2.

One of the problems with existing solutions is that transmissions on unlicensed bands are subject to listen-before-talk (LBT) procedures. Therefore, there is uncertainty as to whether the transmission will go through or not depending on the LBT outcome.

SUMMARY

Some embodiments advantageously provide a method and system for to improve efficiency in HARQ feedback design for network operation, particularly in unlicensed spectrum bands.

Some embodiments of the disclosure include methods and apparatuses for HARQ control information for operation in unlicensed spectrum, such as, for example, NR-U. NR-U refers to NR operation in unlicensed spectrum. In some additional embodiments, there are at least two main aspects that are covered: how to request the HARQ feedback from the WD, and when to send the HARQ feedback to the network node. Some embodiments of the disclosure advantageously provide for a more efficient HARQ feedback design for NR-U operation, and exploit the benefits of shared Channel Occupancy Time (COT) concept to deliver HARQ feedback to the network node. Some embodiments of the disclosure may also guarantee (implicit or explicit) reception of HARQ feedback for all processes even for the transmissions that were missed by the WD.

According to a first aspect of the present disclosure, a method implemented in a wireless device, WD, is provided. The method comprises receiving, from a network node, a first Downlink Control Information, DCI, scheduling a physical downlink shared channel, PDSCH. The method comprises receiving, from the network node, a second DCI, the second DCI comprising a Hybrid Automatic Repeat reQuest Acknowledgement, HARQ-ACK, feedback request trigger triggering a HARQ-ACK feedback for the PDSCH scheduled by the first DCI. The method comprises optionally, responsive to the HARQ-ACK feedback request trigger, transmitting the HARQ-ACK feedback for the PDSCH scheduled by the first DCI.

In some embodiments, the HARQ-ACK feedback request trigger comprises a bit map corresponding to the configured HARQ processes the network node is requesting feedback for. In some embodiments, the HARQ-ACK feedback request trigger triggers the HARQ-ACK feedback based at least in part on a value in a Downlink Assignment Indicator, DAI, field in the DCI scheduling the PDSCH. In some embodiments of this aspect, the receiving the second DCI comprising the HARQ-ACK feedback request trigger further comprises receiving the HARQ-ACK feedback request trigger in a field in the second DCI. In some embodiments of this aspect, the HARQ-ACK feedback request trigger triggers HARQ-ACK feedback for at least a subset of the configured HARQ processes, the at least the subset corresponding to the configured HARQ processes for which an acknowledgement has not yet been received by the network node. In some embodiments of this aspect, the HARQ-ACK feedback request trigger triggers HARQ-ACK feedback for all configured HARQ processes. In some embodiments of this aspect, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback.

In some embodiments of this aspect, the second DCI further comprises at least two Downlink Assignment Indicator, DAI, values, a first DAI value assuming the HARQ-ACK feedback will be successfully decoded and a second DAI value assuming the HARQ-ACK feedback will not be successfully decoded. In some embodiments of this aspect, the method further comprises, responsive to receiving the HARQ-ACK feedback request trigger in the second DCI, determining a HARQ codebook size based at least in part on a value in a Downlink Assignment Indicator, DAI, field in the first DCI. In some embodiments of this aspect, the method further comprises performing a listen-before-talk, LBT, procedure in order to transmit the HARQ-ACK feedback in an unlicensed spectrum; and determining a HARQ codebook size based at least in part on an LBT success.

According to a second aspect of the present disclosure, a method implemented in a wireless device, WD, is provided. The method comprises receiving a Hybrid Automatic Repeat reQuest Acknowledgement, HARQ-ACK, feedback request for a scheduled physical downlink shared channel, PDSCH; and responsive to the received HARQ-ACK feedback request, communicating a HARQ-ACK feedback based at least in part on a size of a gap between an end of the PDSCH and a first uplink, UL, channel scheduled after the PDSCH.

In some embodiments of this aspect, the communicating the HARQ-ACK feedback further comprises communicating the HARQ-ACK feedback within a same channel occupancy time, COT, as the PDSCH based at least in part on the size the gap. In some embodiments of this aspect, the communicating the HARQ-ACK feedback further comprises communicating the HARQ-ACK feedback in an unlicensed spectrum without first performing a listen-before-talk, LBT, procedure based at least in part on the size the gap. In some embodiments, the method further comprises receiving, from the network node, a configuration of whether to perform a listen-before-talk, LBT, procedure before communicating the HARQ-ACK feedback. In some embodiments of this aspect, the method further comprises if the size of the gap at most meets a gap size threshold, communicating the HARQ-ACK feedback in an unlicensed spectrum without first performing a listen-before-talk, LBT, procedure; and if the size of the gap exceeds the gap size threshold, communicating the HARQ-ACK feedback in the unlicensed spectrum after performing the LBT procedure. In some embodiments, the method further comprises receiving, from the network node, a configuration to perform a listen-before-talk, LBT, procedure for a fixed duration. In some embodiments, at least one of at least one downlink transmission that is not associated with HARQ feedback and at least one uplink transmission is scheduled within the gap. In some embodiments of this aspect, the communicating the HARQ-ACK feedback further comprises communicating a HARQ codebook. In some embodiments of this aspect, the communicating the HARQ-ACK feedback further comprises communicating the HARQ-ACK feedback according to a starting position of the HARQ-ACK feedback that is based at least in part on an outcome of a listen-before-talk, LBT, procedure. In some embodiments of this aspect, the communicating the HARQ-ACK feedback further comprises communicating the HARQ-ACK feedback according to a starting position of the HARQ-ACK feedback that is marked by a presence of a Demodulation Reference Signal, DMRS, immediately preceding the HARQ feedback.

According to a third aspect of the present disclosure, a method implemented in a network node is provided. The method comprises optionally, determining scheduling for a physical downlink shared channel, PDSCH; transmitting a first Downlink Control Information, DCI, scheduling the PDSCH; and transmitting a second DCI, the second DCI comprising a Hybrid Automatic Repeat reQuest Acknowledgement, HARQ-ACK, feedback request trigger triggering a HARQ-ACK feedback for the PDSCH scheduled by the first DCI.

In some embodiments, the HARQ-ACK feedback request trigger comprises a bit map corresponding to the configured HARQ processes the network node is requesting feedback for. In some embodiments of this aspect, the method further comprises, as a result of the HARQ-ACK feedback request trigger, receiving and decoding the HARQ-ACK feedback for the PDSCH scheduled by the first DCI. In some embodiments of this aspect, the HARQ-ACK feedback request trigger is a field in the second DCI. In some embodiments of this aspect, the transmitting the second DCI comprising the HARQ-ACK feedback request trigger is responsive to determining that an acknowledgement has not yet been received for at least a subset of the configured HARQ processes. In some embodiments of this aspect, the HARQ-ACK feedback request trigger triggers HARQ-ACK feedback for all configured HARQ processes. In some embodiments of this aspect, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments of this aspect, the transmitting the second DCI comprising the HARQ-ACK feedback request trigger further comprises transmitting the second DCI comprising at least two Downlink Assignment Indicator, DAI, values, a first DAI value assuming the HARQ-ACK feedback will be successfully decoded and a second DAI value assuming the HARQ-ACK feedback will not be successfully decoded. In some embodiments of this aspect, the method further comprises, as a result of transmitting the HARQ-ACK feedback request trigger in the second DCI, receiving the HARQ-ACK feedback having a HARQ codebook size based at least in part on a value in a Downlink Assignment Indicator, DAI, field in the first DCI.

According to a fourth aspect of the present disclosure, a method implemented in a network node is provided. The method comprises transmitting a Hybrid Automatic Repeat reQuest Acknowledgement, HARQ-ACK, feedback request for a scheduled physical downlink shared channel, PDSCH; and as a result of the HARQ-ACK feedback request, receiving a HARQ-ACK feedback based at least in part on a size of a gap between an end of the PDSCH and a first uplink, UL, channel scheduled after the PDSCH.

In some embodiments of this aspect, the receiving the HARQ-ACK feedback further comprises receiving the HARQ-ACK feedback within a same channel occupancy time, COT, as the PDSCH based at least in part on the size the gap. In some embodiments, the method further comprises transmitting, to a wireless device, WD, a configuration of whether to perform a listen-before-talk, LBT, procedure before communicating the HARQ-ACK feedback. In some embodiments, the method further comprises scheduling at least one of at least one downlink transmission that is not associated with HARQ feedback and at least one uplink transmission within the gap. In some embodiments, the method further comprises configuring a wireless device, WD, to perform a listen-before-talk, LBT, procedure for a fixed duration. In some embodiments of this aspect, the receiving the HARQ-ACK feedback further comprises receiving a HARQ codebook. In some embodiments of this aspect, the receiving the HARQ-ACK feedback further comprises receiving the HARQ-ACK feedback according to a starting position of the HARQ-ACK feedback that is based at least in part on an outcome of a listen-before-talk, LBT, procedure. In some embodiments of this aspect, the receiving the HARQ-ACK feedback further comprises receiving the HARQ-ACK feedback according to a starting position of the HARQ-ACK feedback that is marked by a presence of a Demodulation Reference Signal, DMRS, immediately preceding the HARQ feedback.

According to a fifth aspect of the present disclosure, a wireless device, WD, configured to communicate with a network node is provided. The WD comprises a radio interface and processing circuitry in communication with the radio interface. The processing circuitry is configured to cause the radio interface to: receive, from a network node, a first Downlink Control Information, DCI, scheduling a physical downlink shared channel, PDSCH; and receive, from the network node, a second DCI, the second DCI comprising a Hybrid Automatic Repeat reQuest Acknowledgement, HARQ-ACK, feedback request trigger triggering a HARQ-ACK feedback for the PDSCH scheduled by the first DCI. The processing circuitry is further configured to cause the radio interface to, optionally, responsive to the HARQ-ACK feedback request trigger, transmit the HARQ-ACK feedback for the PDSCH scheduled by the first DCI In some embodiments, the HARQ-ACK feedback request trigger comprises a bit map corresponding to the configured HARQ processes the network node is requesting feedback for. In some embodiments, the HARQ-ACK feedback request trigger triggers the HARQ-ACK feedback based at least in part on a value in a Downlink Assignment Indicator, DAI, field in the DCI scheduling the PDSCH. In some embodiments of this aspect, the processing circuitry is further configured to cause the radio interface to receive the second DCI comprising the HARQ-ACK feedback request trigger by being configured to cause the radio interface to receive the HARQ-ACK feedback request trigger in a field in the second DCI. In some embodiments of this aspect, the HARQ-ACK feedback request trigger triggers HARQ-ACK feedback for at least a subset of the configured HARQ processes, the at least the subset corresponding to the configured HARQ processes for which an acknowledgement has not yet been received by the network node. In some embodiments of this aspect, the HARQ-ACK feedback request trigger triggers HARQ-ACK feedback for all configured HARQ processes. In some embodiments of this aspect, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments of this aspect, the second DCI further comprises at least two Downlink Assignment Indicator, DAI, values, a first DAI value assuming the HARQ-ACK feedback will be successfully decoded and a second DAI value assuming the HARQ-ACK feedback will not be successfully decoded. In some embodiments of this aspect, the processing circuitry is further configured to, responsive to receiving the HARQ-ACK feedback request trigger in the second DCI, determine a HARQ codebook size based at least in part on a value in a Downlink Assignment Indicator, DAI, field in the first DCI. In some embodiments of this aspect, the processing circuitry is further configured to perform a listen-before-talk, LBT, procedure in order to transmit the HARQ-ACK feedback in an unlicensed spectrum; and determine a HARQ codebook size based at least in part on an LBT success.

According to a sixth aspect of the present disclosure, a wireless device, WD, configured to communicate with a network node is provided. The WD comprises a radio interface and processing circuitry in communication with the radio interface, the processing circuitry configured to cause the radio interface to: receive a Hybrid Automatic Repeat reQuest Acknowledgement, HARQ-ACK, feedback request for a scheduled physical downlink shared channel, PDSCH; and responsive to the received HARQ-ACK feedback request, communicate a HARQ-ACK feedback based at least in part on a size of a gap between an end of the PDSCH and a first uplink, UL, channel scheduled after the PDSCH.

In some embodiments of this aspect, the processing circuitry is further configured to cause the radio interface to communicate the HARQ-ACK feedback by being configured to cause the radio interface to communicate the HARQ-ACK feedback within a same channel occupancy time, COT, as the PDSCH based at least in part on the size the gap. In some embodiments of this aspect, the processing circuitry is further configured to cause the radio interface to communicate the HARQ-ACK feedback by being configured to cause the radio interface to communicate the HARQ-ACK feedback in an unlicensed spectrum without first performing a listen-before-talk, LBT, procedure based at least in part on the size the gap. In some embodiments of this aspect, the processing circuitry is further configured to cause the radio interface to receive, from the network node, a configuration of whether to perform a listen-before-talk, LBT, procedure before communicating the HARQ-ACK feedback. In some embodiments of this aspect, the processing circuitry is further configured to cause the radio interface to communicate the HARQ-ACK feedback by being configured to cause the radio interface to if the size of the gap at most meets a gap size threshold, communicate the HARQ-ACK feedback in an unlicensed spectrum without first performing a listen-before-talk, LBT, procedure; and if the size of the gap exceeds the gap size threshold, communicate the HARQ-ACK feedback in the unlicensed spectrum after performing the LBT procedure. In some embodiments, the processing circuitry is further configured to cause the radio interface to receive, from the network node, a configuration to perform a listen-before-talk, LBT, procedure for a fixed duration. In some embodiments, at least one of at least one downlink transmission that is not associated with HARQ feedback and at least one uplink transmission is scheduled within the gap. In some embodiments of this aspect, the processing circuitry is further configured to cause the radio interface to communicate the HARQ-ACK feedback by being configured to cause the radio interface to communicate the HARQ-ACK feedback as a HARQ codebook. In some embodiments of this aspect, the processing circuitry is further configured to cause the radio interface to communicate the HARQ-ACK feedback by being configured to cause the radio interface to communicate the HARQ-ACK feedback according to a starting position of the HARQ-ACK feedback, the starting position being based at least in part on an outcome of a listen-before-talk, LBT, procedure. In some embodiments of this aspect, the processing circuitry is further configured to cause the radio interface to communicate the HARQ-ACK feedback by being configured to cause the radio interface to communicate the HARQ-ACK feedback according to a starting position of the HARQ-ACK feedback, the starting position being marked by a presence of a Demodulation Reference Signal, DMRS, immediately preceding the HARQ feedback.

According to a seventh aspect of the present disclosure, a network node configured to communicate with a wireless device, WD, is provided. The network node comprises a radio interface and processing circuitry in communication with the radio interface. The processing circuitry is configured to optionally, determine scheduling for a physical downlink shared channel, PDSCH; cause the radio interface to transmit a first Downlink Control Information, DCI, scheduling the PDSCH; and cause the radio interface to transmit a second DCI, the second DCI comprising a Hybrid Automatic Repeat reQuest Acknowledgement, HARQ-ACK, feedback request trigger triggering a HARQ-ACK feedback for the PDSCH scheduled by the first DCI.

In some embodiments, the HARQ-ACK feedback request trigger comprises a bit map corresponding to the configured HARQ processes the network node is requesting feedback for. In some embodiments of this aspect, the processing circuitry is further configured to, as a result of the HARQ-ACK feedback request trigger, receive and decode the HARQ-ACK feedback for the PDSCH scheduled by the first DCI. In some embodiments of this aspect, the HARQ-ACK feedback request trigger is a field in the second DCI. In some embodiments of this aspect, the processing circuitry configured to cause the radio interface to transmit the second DCI by being configured to cause the radio interface to transmit the second DCI comprising the HARQ-ACK feedback request trigger responsive to determining that an acknowledgement has not yet been received for at least a subset of the configured HARQ processes. In some embodiments of this aspect, the HARQ-ACK feedback request trigger triggers HARQ-ACK feedback for all configured HARQ processes. In some embodiments of this aspect, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments of this aspect, the processing circuitry configured to cause the radio interface to transmit the second DCI by being configured to cause the radio interface to transmit the second DCI comprising at least two Downlink Assignment Indicator, DAI, values, a first DAI value assuming the HARQ-ACK feedback will be successfully decoded and a second DAI value assuming the HARQ-ACK feedback will not be successfully decoded. In some embodiments of this aspect, the processing circuitry configured to cause the radio interface to, as a result of transmitting the HARQ-ACK feedback request trigger in the second DCI, receive the HARQ-ACK feedback having a HARQ codebook size based at least in part on a value in a Downlink Assignment Indicator, DAI, field in the first DCI.

According to an eight aspect of the present disclosure, a network node configured to communicate with a wireless device, WD, is provided. The network node comprises a radio interface and processing circuitry in communication with the radio interface. The processing circuitry is configured to cause the radio interface to transmit a Hybrid Automatic Repeat reQuest Acknowledgement, HARQ-ACK, feedback request for a scheduled physical downlink shared channel, PDSCH; and, as a result of the HARQ-ACK feedback request, receive a HARQ-ACK feedback based at least in part on a size of a gap between an end of the PDSCH and a first uplink, UL, channel scheduled after the PDSCH.

In some embodiments of this aspect, the processing circuitry is further configured to cause the radio interface to receive the HARQ-ACK feedback by being configured to cause the radio interface to receive the HARQ-ACK feedback within a same channel occupancy time, COT, as the PDSCH based at least in part on the size the gap. In some embodiments, the processing circuitry is further configured to cause the radio interface to transmit, to a wireless device, WD, a configuration of whether to perform a listen-before-talk, LBT, procedure before communicating the HARQ-ACK feedback. In some embodiments, the processing circuitry is further configured to schedule at least one of at least one downlink transmission that is not associated with HARQ feedback and at least one uplink transmission within the gap. In some embodiments, the processing circuitry is further configured to cause the radio interface to configure a wireless device, WD, to perform a listen-before-talk, LBT, procedure for a fixed duration. In some embodiments of this aspect, the processing circuitry is further configured to cause the radio interface to receive the HARQ-ACK feedback by being configured to cause the radio interface to receive the HARQ-ACK feedback in a HARQ codebook. In some embodiments of this aspect, the processing circuitry is further configured to cause the radio interface to receive the HARQ-ACK feedback by being configured to cause the radio interface to receive the HARQ-ACK feedback according to a starting position of the HARQ-ACK feedback that is based at least in part on an outcome of a listen-before-talk, LBT, procedure. In some embodiments of this aspect, the processing circuitry is further configured to cause the radio interface to receive the HARQ-ACK feedback by being configured to cause the radio interface to receive the HARQ-ACK feedback according to a starting position of the HARQ-ACK feedback that is marked by a presence of a Demodulation Reference Signal, DMRS, immediately preceding the HARQ feedback.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating an exemplary method implemented in a communication system including a host computer, a network node and a wireless device according to some embodiments of the present disclosure;

FIG. 6 is a flowchart illustrating an exemplary method implemented in a communication system including a host computer, a network node and a wireless device according to some embodiments of the present disclosure;

FIG. 11 is a flowchart of an exemplary process in a wireless device for HARQ responses according to some embodiments of the present disclosure;

FIG. 12 is a flowchart of yet another exemplary process in a wireless device for HARQ responses according to some embodiments of the present disclosure;

DETAILED DESCRIPTION

Figure 1:
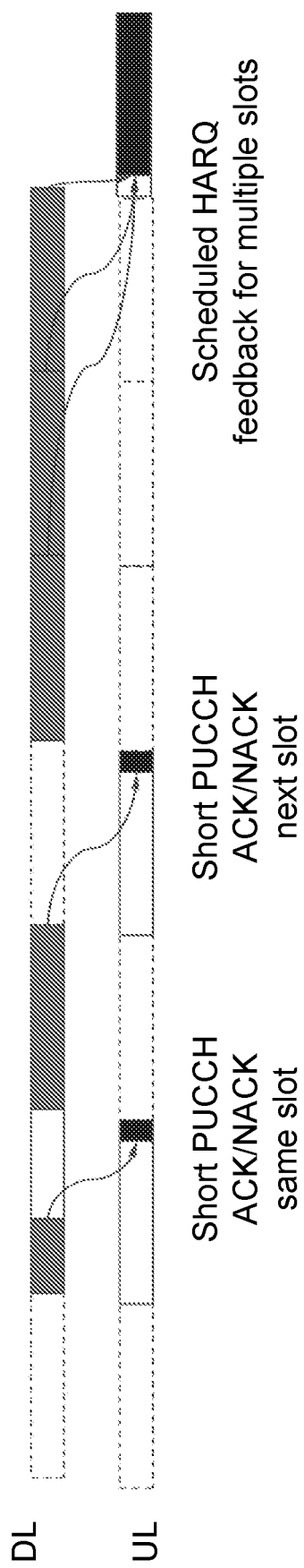
FIG. 1 illustrates an example of NR HARQ feedback flexible timing.
Figure 2:
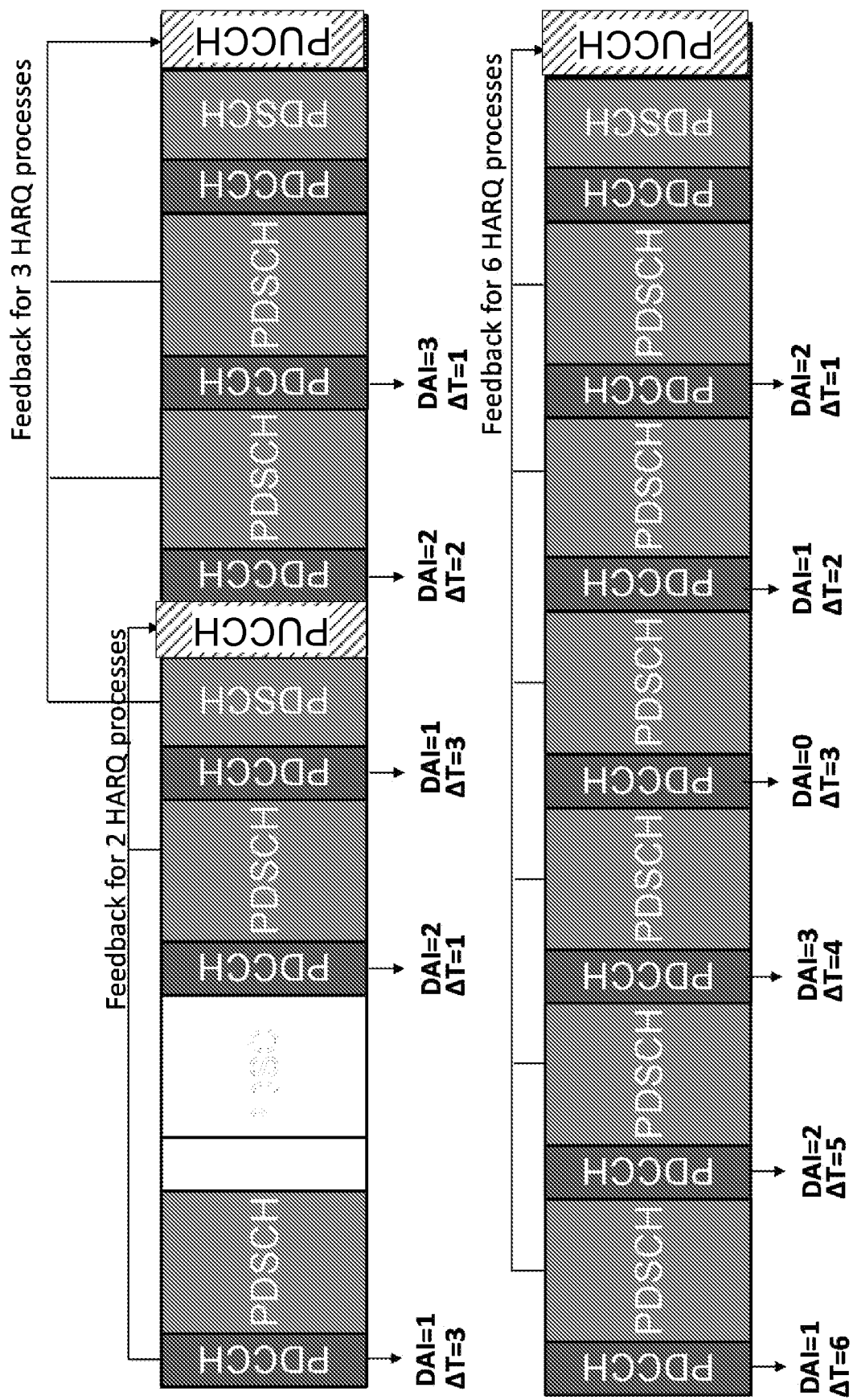
FIG. 2 illustrates an example of DAI value in Dynamic HARQ codebook.

One of the problems with existing HARQ feedback design is that transmissions on unlicensed bands are subject to listen-before-talk (LBT) procedures. Therefore, there is uncertainty as to whether the transmission will go through or not depending on the LBT outcome.

For example, if HARQ feedback transmission on Uplink Control Information (UCI) is subject to LBT, there is a risk that the WD will not perform the transmission depending on the LBT outcome. Due to the one-to-one mapping between PDSCH and corresponding feedback in the time domain, if the WD fails to transmit the feedback at the predefined time location, the network node (e.g., gNB) may have to assume NACK and retransmit all the corresponding PDSCHs. The latter can be considered an inefficient utilization of the band and may also cause an unnecessary increase in channel contention.

Even if the WD successfully transmits the HARQ feedback, there are chances that the network node (e.g., gNB) may not be able to detect it. From the network node's (e.g., gNB) perspective, failed LBT or missed UCI transmissions are indistinguishable. Due to the one-to-one mapping between PDSCH and corresponding feedback in the time domain, if the network node fails to detect the feedback in the predefined time location, the network node will have to assume NACK and retransmit all the corresponding PDSCHs.

The DAI value in, for example, NR rel-15 is only 2-bits, and after reaching the highest DAI value (i.e., 4), the value is reset again to the smallest value. This means that if the WD missed 4 or more PDSCH transmissions, the WD may not be able to correctly calculate the codebook size, and therefore there will be misalignment between the network node's expected codebook size and the reported one by the WD. While missing 4 or more consecutive PDSCH on a licensed carrier is unlikely, it is highly likely to happen on an unlicensed band due to collisions, and therefore, the 2-bit DAI may cause an issue.

Thus, some embodiments advantageously provide a method and apparatus for improving efficiency in HARQ feedback design for network operation and, in some embodiments, for unlicensed spectrum bands.

Before describing in detail exemplary embodiments, it is noted that the embodiments reside primarily in combinations of apparatus components and processing steps related to methods and apparatuses for HARQ. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In some embodiments, for a WD, different sets of resources may be configured for control information and/or transmission on a physical control channel like PUCCH or PSCCH. The sets may be configured with control signaling, in particular RRC layer signaling and/or semi-statically, e.g. by a signaling radio node or node arrangement (e.g., network node). Each set may comprise one or more resources. Different sets may comprise different numbers of resources, or the same. A resource may be an indicatable resource, and/or may be pointed to an indicator, which may be transmitted in control signaling by e.g., network node, to be received by the WD. Such an indicator may for example be an ARI or UCI pointer or other indicator. The (maximum) number of resources in a set (indicatable resources) may correspond to the number of resources indicatable with such an indicator, e.g. based in its size in bits. For example, the number may be a multiple or power of 2, e.g. 2 or 4. Each set may be associated to a control information size class and/or an associated format. The size class may for example indicate a payload size for the information, or a part thereof, e.g. acknowledgement information, and/or a range of sizes. One or more of the size classes and/or ranges may be configurable, e.g. semi-statically or with RRC signaling. In some embodiments, the payload may include, for example, PUCCH information, PUSCH information, uplink control information (UCI), a DMRS, etc.

A transmission resource may be a time and/or frequency resource, e.g. a resource element or a group of resource elements. A resource may extend in time over one or more symbols, e.g. within a slot or in some cases, across one or more slot boundaries. It may be considered that a resource extends in time over one or more subcarriers, and/or one or more physical resource blocks. In some cases, a resource may be equal or shorter in time domain than a slot duration (which may be 14 symbols, or another value, e.g. a value below 20 symbols). A resource may be configured for, and/or be associated to, a channel, e.g. a control channel, which may be a physical channel, e.g. a PUCCH or PSCCH, and/or for a specific type of control information or signaling. One or more specific transmission message formats may be associated to a resource. Such a format may for example specify payload size and/or size range, and/or structure, and/or modulation and coding, and/or repetition rate and/or code rate and/or duration of transmission, e.g. of a message. A resource may be larger (in time and/or frequency) than necessary to carry associated and/or configured control information.

In some embodiments, a set of resources, and/or the sets of resources, may be configured by e.g., network node, with one or more messages, e.g. semi-statically and/or with RRC signaling, and/or dynamically, e.g. with physical layer signaling, like DCI or SCI signaling. It may be considered that a set of resources is configured with semi-static and/or RRC layer signaling, and one of the resources may be indicated (configured) with dynamic and/or physical layer signaling. This may particularly be performed for resource/s associated to, and/or configured for, acknowledgement information. Generally, it may be considered that the network, e.g. a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Acknowledgement information may pertain to one or more acknowledgement signaling processes, e.g. HARQ processes or ARQ processes. Measurement information may be represented by channel state information (e.g., CSI), e.g. channel quality information (e.g., CQI) and/or rank information (e.g., RI) and/or precoding information (e.g., PMI), and/or beamforming information (which in some cases may be considered a type of its own). The number of bits A of acknowledgment information may be configured or configurable, e.g. based on a HARQ configuration or codebook, which may be configured via RRC layer signaling and/or semi-statically, and/or dynamically, e.g. with one or more counters like a Downlink Assignment Indicator (DAI) or uplink grant counter or total DAI.

In some embodiments, control information on one or more resources may be considered to be transmitted in a message having a specific format. A message may comprise or represent bits representing payload information and coding bits, e.g., for error coding.

Receiving control information may comprise receiving one or more control information messages. It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Acknowledgement information or feedback signaling carrying it may pertain to signaling scheduled by control signaling, and/or to the control signaling itself, in particular if it is of command type. The feedback signaling may pertain to a plurality of subject transmission, which may be on different channels and/or carriers, and/or may comprise data signaling and/or control signaling. The feedback signaling may be based on a codebook, which may be based on one or more size indications and/or assignment indications, which may be received with a plurality of control signalings and/or control messages, e.g. in the same or different transmission timing structures, and/or in the same or different (target) sets of resources. Transmitting feedback signaling may comprise determining the codebook, e.g. based on control information in one or more control information messages. A codebook may pertain to feedback signaling at a single and/or specific instant, e.g. a single PUCCH or PUSCH transmission, and/or in one message or with jointly encoded and/or modulated feedback information.

It may be considered that control signaling (e.g., DCI or SCI) may comprise information indicating the triggering of feedback signaling (e.g., HARQ response(s)). Triggering feedback signaling may comprise indicating that feedback signaling should be transmitted, and/or indicating one or more resources and/or timing for feedback signaling, and/or indicating subject signaling or subject transmission to which the feedback signaling may pertain.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the disclosure provide for methods and apparatuses for HARQ control information for operation in unlicensed spectrum, such as, for example, NR-U. In some additional embodiments, there are at least two aspects that are covered by the disclosure: how to request the HARQ feedback from the WD, and when to send the HARQ feedback to the network node. Some embodiments of the disclosure advantageously provide for a more efficient HARQ feedback design for NR-U operation as compared with other arrangements. Some embodiments advantageously exploit the benefits of the shared COT concept to deliver HARQ feedback to the network node. Some embodiments of the disclosure may also guarantee, or at least improve over existing techniques, (implicit or explicit) reception of HARQ feedback for HARQ processes for operation in the unlicensed spectrum, even for the transmissions that were missed by the WD.

Figure 3:
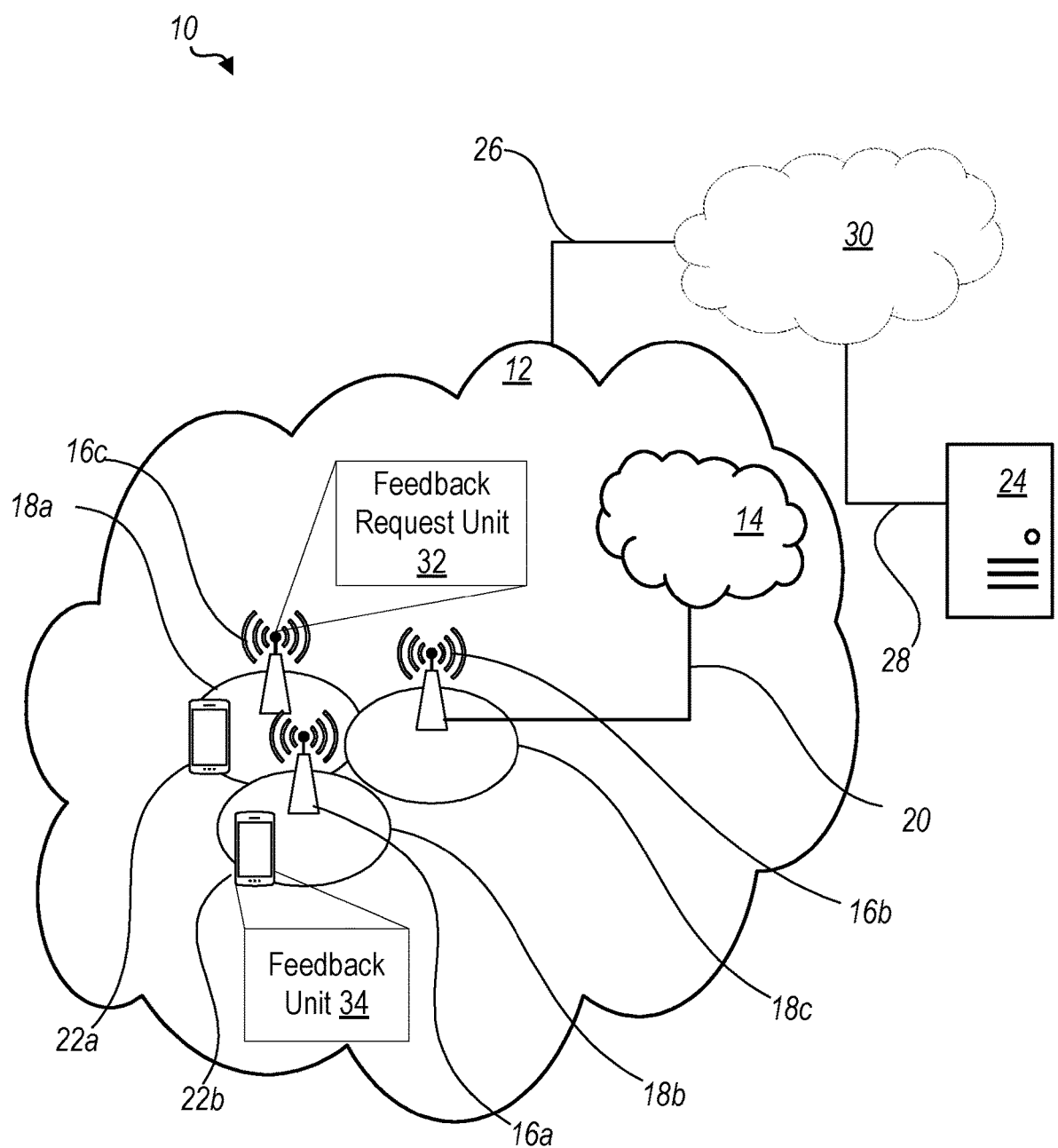
FIG. 3 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a feedback request unit 32 which is configured to optionally, determine scheduling for a physical downlink shared channel, PDSCH; transmit a first Downlink Control Information, DCI, scheduling the PDSCH; and transmit a second DCI, the second DCI comprising a Hybrid Automatic Repeat reQuest Acknowledgement, HARQ-ACK, feedback request trigger triggering a HARQ-ACK feedback for the PDSCH scheduled by the first DCI. In another embodiment, feedback request unit 32 is configured to transmit a Hybrid Automatic Repeat reQuest Acknowledgement, HARQ-ACK, feedback request for a scheduled physical downlink shared channel, PDSCH; and as a result of the HARQ-ACK feedback request, receive a HARQ-ACK feedback based at least in part on a size of a gap between an end of the PDSCH and a first uplink, UL, channel scheduled after the PDSCH. In yet another embodiment, feedback request unit 32 is configured to communicate, to the WD 22, an acknowledgement feedback request; indicate, to the WD 22, whether to perform a listen-before-talk (LBT) procedure before communicating an acknowledgement feedback response; and receive, from the WD 22, the acknowledgement feedback response, as a result of the acknowledgement feedback request. In some embodiments, the feedback request unit 32 may be hardware associated with the network node 16, such as processing circuitry discussed herein below for the network node 16, which may implement methods discussed herein below for the network node 16. In some embodiments, the feedback request unit 32 may be considered a feedback requestor.

A wireless device 22 is configured to include a feedback unit 34 which is configured to receive, from a network node, a first Downlink Control Information, DCI, scheduling a physical downlink shared channel, PDSCH; receive, from the network node, a second DCI, the second DCI comprising a Hybrid Automatic Repeat reQuest Acknowledgement, HARQ-ACK, feedback request trigger triggering a HARQ-ACK feedback for the PDSCH scheduled by the first DCI; and optionally, responsive to the HARQ-ACK feedback request trigger, transmit the HARQ-ACK feedback for the PDSCH scheduled by the first DCI. In another embodiment, feedback unit 34 is configured to receive a Hybrid Automatic Repeat reQuest Acknowledgement, HARQ-ACK, feedback request for a scheduled physical downlink shared channel, PDSCH; and responsive to the received HARQ-ACK feedback request, communicate a HARQ-ACK feedback based at least in part on a size of a gap between an end of the PDSCH and a first uplink, UL, channel scheduled after the PDSCH. In yet another embodiment, feedback unit 34 is configured to receive, from the network node 16, an acknowledgement feedback request; determine whether to perform a listen-before-talk (LBT) procedure before communicating an acknowledgement feedback response; and responsive to the received acknowledgement feedback request, communicate the acknowledgement feedback response to the network node 16 one of with and without performing the LBT procedure based on the determination. In some embodiments, the feedback unit 34 may be hardware associated with the WD 22, such as processing circuitry discussed herein below for the WD 22, which may implement methods discussed herein below for the WD 22. In some embodiments, the feedback unit 34 may be considered a feedback provider.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include feedback request unit 32 configured to optionally, determine scheduling for a physical downlink shared channel, PDSCH; cause the radio interface 62 to transmit a first Downlink Control Information, DCI, scheduling the PDSCH; and cause the radio interface 62 to transmit a second DCI, the second DCI comprising a Hybrid Automatic Repeat reQuest Acknowledgement, HARQ-ACK, feedback request trigger triggering a HARQ-ACK feedback for the PDSCH scheduled by the first DCI.

In some embodiments, the HARQ-ACK feedback request trigger comprises a bit map corresponding to the configured HARQ processes the network node 16 is requesting feedback for. In some embodiments, the processing circuitry 68 is further configured to, as a result of the HARQ-ACK feedback request trigger, receive and decode the HARQ-ACK feedback for the PDSCH scheduled by the first DCI. In some embodiments, the HARQ-ACK feedback request trigger is a field in the second DCI. In some embodiments, the processing circuitry 68 configured to cause the radio interface 62 to transmit the second DCI by being configured to cause the radio interface 62 to transmit the second DCI comprising the HARQ-ACK feedback request trigger responsive to determining that an acknowledgement has not yet been received for at least a subset of the configured HARQ processes. In some embodiments, the HARQ-ACK feedback request trigger triggers HARQ-ACK feedback for all configured HARQ processes. In some embodiments, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments, the processing circuitry 68 configured to cause the radio interface 62 to transmit the second DCI by being configured to cause the radio interface 62 to transmit the second DCI comprising at least two Downlink Assignment Indicator, DAI, values, a first DAI value assuming the HARQ-ACK feedback will be successfully decoded and a second DAI value assuming the HARQ-ACK feedback will not be successfully decoded. In some embodiments, the processing circuitry 68 configured to cause the radio interface 62 to, as a result of transmitting the HARQ-ACK feedback request trigger in the second DCI, receive the HARQ-ACK feedback having a HARQ codebook size based at least in part on a value in a Downlink Assignment Indicator, DAI, field in the first DCI.

In yet another embodiment, feedback request unit 32 is configured to cause the radio interface 62 to transmit a Hybrid Automatic Repeat reQuest Acknowledgement, HARQ-ACK, feedback request for a scheduled physical downlink shared channel, PDSCH; and as a result of the HARQ-ACK feedback request, receive a HARQ-ACK feedback based at least in part on a size of a gap between an end of the PDSCH and a first uplink, UL, channel scheduled after the PDSCH. In some embodiments, the processing circuitry 68 is further configured to cause the radio interface 62 to receive the HARQ-ACK feedback by being configured to cause the radio interface 62 to receive the HARQ-ACK feedback within a same channel occupancy time, COT, as the PDSCH based at least in part on the size the gap. In some embodiments, the processing circuitry 68 is further configured to cause the radio interface 62 to transmit, to a wireless device, WD 22, a configuration of whether to perform a listen-before-talk, LBT, procedure before communicating the HARQ-ACK feedback. In some embodiments, the processing circuitry 68 is further configured to schedule at least one of at least one downlink transmission that is not associated with HARQ feedback and at least one uplink transmission within the gap. In some embodiments, the processing circuitry 68 is further configured to cause the radio interface 62 to configure a wireless device, WD 22, to perform a listen-before-talk, LBT, procedure for a fixed duration. In some embodiments, the processing circuitry 68 is further configured to cause the radio interface 62 to receive the HARQ-ACK feedback by being configured to cause the radio interface 62 to receive the HARQ-ACK feedback in a HARQ codebook. In some embodiments, the processing circuitry 68 is further configured to cause the radio interface 62 to receive the HARQ-ACK feedback by being configured to cause the radio interface 62 to receive the HARQ-ACK feedback according to a starting position of the HARQ-ACK feedback that is based at least in part on an outcome of a listen-before-talk, LBT, procedure. In some embodiments, the processing circuitry 68 is further configured to cause the radio interface 62 to receive the HARQ-ACK feedback by being configured to cause the radio interface 62 to receive the HARQ-ACK feedback according to a starting position of the HARQ-ACK feedback that is marked by a presence of a Demodulation Reference Signal, DMRS, immediately preceding the HARQ feedback.

In yet another embodiment, feedback request unit 32 is configured to communicate (via e.g., radio interface 62), to the WD 22, an acknowledgement feedback request; indicate, to the WD 22, whether to perform a listen-before-talk (LBT) procedure before communicating an acknowledgement feedback response; and receive (via e.g., radio interface 62), from the WD 22, the acknowledgement feedback response, as a result of the acknowledgement feedback request. In some embodiments, the processing circuitry 68 is further configured to perform an LBT procedure before communicating the acknowledgement feedback request to the WD 22. In some embodiments, the acknowledgement feedback request is for acknowledging receipt of downlink (DL) information communicated by the network node 16 on at least one DL channel. In some embodiments, the processing circuitry 68 is further configured to schedule an Uplink (UL) channel for the WD 22 to include the acknowledgement feedback response and to schedule a gap between a most recent DL channel of the at least one DL channel and the scheduled UL channel. In some embodiments, the gap is scheduled (by e.g., network node 16) for one or more transmissions (from e.g., network node 16 and/or WD 22) that are not associated with HARQ. In some embodiments, the acknowledgement feedback request is an aggregate HARQ request to send a plurality of HARQ feedback responses corresponding to at least one of all and a subset of all configured HARQ processes. In some embodiments, the at least one downlink channel includes one or more Physical Downlink Shared Channels (PDSCH). In some embodiments, the acknowledgement feedback request is communicated within an Uplink Control Information (UCI) message. In some embodiments, the acknowledgement feedback request is a Hybrid Automatic Repeat ReQuest (HARQ) request.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a feedback unit 34 configured to cause the radio interface 82 to receive, from a network node 16, a first Downlink Control Information, DCI, scheduling a physical downlink shared channel, PDSCH; and receive, from the network node 16, a second DCI, the second DCI comprising a Hybrid Automatic Repeat reQuest Acknowledgement, HARQ-ACK, feedback request trigger triggering a HARQ-ACK feedback for the PDSCH scheduled by the first DCI. Feedback unit 34 is optionally configured to cause the radio interface 82 to responsive to the HARQ-ACK feedback request trigger, transmit the HARQ-ACK feedback for the PDSCH scheduled by the first DCI.

In some embodiments, the HARQ-ACK feedback request trigger comprises a bit map corresponding to the configured HARQ processes the network node is requesting feedback for. In some embodiments, the HARQ-ACK feedback request trigger triggers the HARQ-ACK feedback based at least in part on a value in a Downlink Assignment Indicator, DAI, field in the DCI scheduling the PDSCH. In some embodiments, the processing circuitry 84 is further configured to cause the radio interface 82 to receive the second DCI comprising the HARQ-ACK feedback request trigger by being configured to cause the radio interface 82 to receive the HARQ-ACK feedback request trigger in a field in the second DCI. In some embodiments, the HARQ-ACK feedback request trigger triggers HARQ-ACK feedback for at least a subset of the configured HARQ processes, the at least the subset corresponding to the configured HARQ processes for which an acknowledgement has not yet been received by the network node. In some embodiments, the HARQ-ACK feedback request trigger triggers HARQ-ACK feedback for all configured HARQ processes. In some embodiments, the HARQ-ACK feedback request trigger comprises at least one of an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments, the second DCI further comprises at least two Downlink Assignment Indicator, DAI, values, a first DAI value assuming the HARQ-ACK feedback will be successfully decoded and a second DAI value assuming the HARQ-ACK feedback will not be successfully decoded. In some embodiments, the processing circuitry 84 is further configured to, responsive to receiving the HARQ-ACK feedback request trigger in the second DCI, determine a HARQ codebook size based at least in part on a value in a Downlink Assignment Indicator, DAI, field in the first DCI. In some embodiments, the processing circuitry 84 is further configured to perform a listen-before-talk, LBT, procedure in order to transmit the HARQ-ACK feedback in an unlicensed spectrum; and determine a HARQ codebook size based at least in part on an LBT success.

In another embodiment, feedback unit 34 is configured to cause the radio interface 82 to receive a Hybrid Automatic Repeat reQuest Acknowledgement, HARQ-ACK, feedback request for a scheduled physical downlink shared channel, PDSCH; and responsive to the received HARQ-ACK feedback request, communicate a HARQ-ACK feedback based at least in part on a size of a gap between an end of the PDSCH and a first uplink, UL, channel scheduled after the PDSCH. In some embodiments, the processing circuitry 84 is further configured to cause the radio interface 82 to communicate the HARQ-ACK feedback by being configured to cause the radio interface 82 to communicate the HARQ-ACK feedback within a same channel occupancy time, COT, as the PDSCH based at least in part on the size the gap. In some embodiments, the processing circuitry 84 is further configured to cause the radio interface 82 to communicate the HARQ-ACK feedback by being configured to cause the radio interface 82 to communicate the HARQ-ACK feedback in an unlicensed spectrum without first performing a listen-before-talk, LBT, procedure based at least in part on the size the gap. In some embodiments, the processing circuitry 84 is further configured to cause the radio interface 82 to receive, from the network node 16, a configuration of whether to perform a listen-before-talk, LBT, procedure before communicating the HARQ-ACK feedback. In some embodiments, the processing circuitry 84 is further configured to cause the radio interface 82 to communicate the HARQ-ACK feedback by being configured to cause the radio interface 82 to if the size of the gap at most meets a gap size threshold, communicate the HARQ-ACK feedback in an unlicensed spectrum without first performing a listen-before-talk, LBT, procedure; and if the size of the gap exceeds the gap size threshold, communicate the HARQ-ACK feedback in the unlicensed spectrum after performing the LBT procedure. In some embodiments, the processing circuitry 84 is further configured to cause the radio interface 82 to receive, from the network node 16, a configuration to perform a listen-before-talk, LBT, procedure for a fixed duration. In some embodiments, at least one of at least one downlink transmission that is not associated with HARQ feedback and at least one uplink transmission is scheduled within the gap. In some embodiment, the processing circuitry 84 is further configured to cause the radio interface 82 to communicate the HARQ-ACK feedback by being configured to cause the radio interface 82 to communicate the HARQ-ACK feedback as a HARQ codebook. In some embodiments, the processing circuitry 84 is further configured to cause the radio interface 82 to communicate the HARQ-ACK feedback by being configured to cause the radio interface 82 to communicate the HARQ-ACK feedback according to a starting position of the HARQ-ACK feedback, the starting position being based at least in part on an outcome of a listen-before-talk, LBT, procedure. In some embodiments, the processing circuitry 84 is further configured to cause the radio interface 82 to communicate the HARQ-ACK feedback by being configured to cause the radio interface 82 to communicate the HARQ-ACK feedback according to a starting position of the HARQ-ACK feedback, the starting position being marked by a presence of a Demodulation Reference Signal, DMRS, immediately preceding the HARQ feedback.

In yet another embodiment, feedback unit 34 is configured to receive, from the network node 16, an acknowledgement feedback request; determine whether to perform a listen-before-talk (LBT) procedure before communicating an acknowledgement feedback response; and responsive to the received acknowledgement feedback request, communicate (via e.g., radio interface 82) the acknowledgement feedback response to the network node 16 one of with and without performing the LBT procedure based on the determination. In some embodiments, the processing circuitry 84 is configured to determine whether to perform the LBT procedure by being further configured to determine a size of a gap between a downlink (DL) channel and a first uplink (UL) channel scheduled after the DL channel. In some embodiments, the processing circuitry 84 is configured to: if the size of the gap between the DL channel and the first UL channel at most meets a gap size threshold, determining not to perform the LBT procedure and communicating (via e.g., radio interface 82) the acknowledgement feedback response by communicating the acknowledgement feedback response without performing the LBT procedure; and if the size of the gap between the DL channel and the first UL channel exceeds the gap size threshold, determining to perform the LBT procedure and performing the LBT procedure before communicating the acknowledgement feedback response. In some embodiments, the gap is scheduled for one or more transmissions that are not associated with HARQ. In some embodiments, the acknowledgement feedback request is an aggregate HARQ request to send a plurality of HARQ feedback responses; and based on the determination and responsive to the received aggregate HARQ request, communicate (via e.g., radio interface 82) a plurality of HARQ feedback responses to the network node 16 one of with and without performing the LBT procedure, the plurality of HARQ feedback responses corresponding to at least one of all and a subset of all configured HARQ processes for the WD 22. In some embodiments, the acknowledgement feedback response is a Hybrid Automatic Repeat ReQuest (HARQ) response message. In some embodiments, the acknowledgement feedback request is received and the acknowledgement feedback response is communicated (via e.g., radio interface 82) over an unlicensed spectrum.

Figure 4:
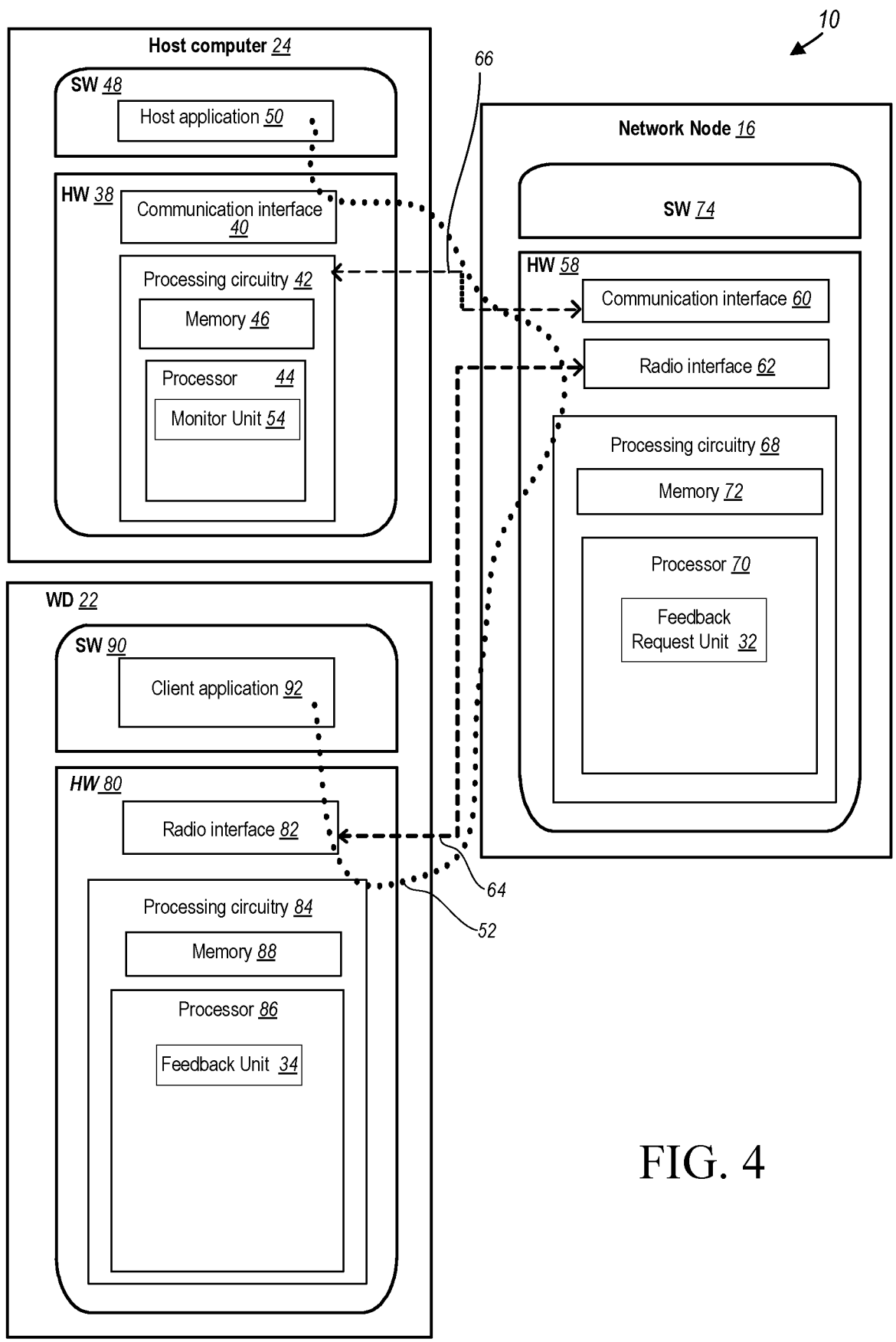
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as feedback request unit 32, and feedback unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figure 7:
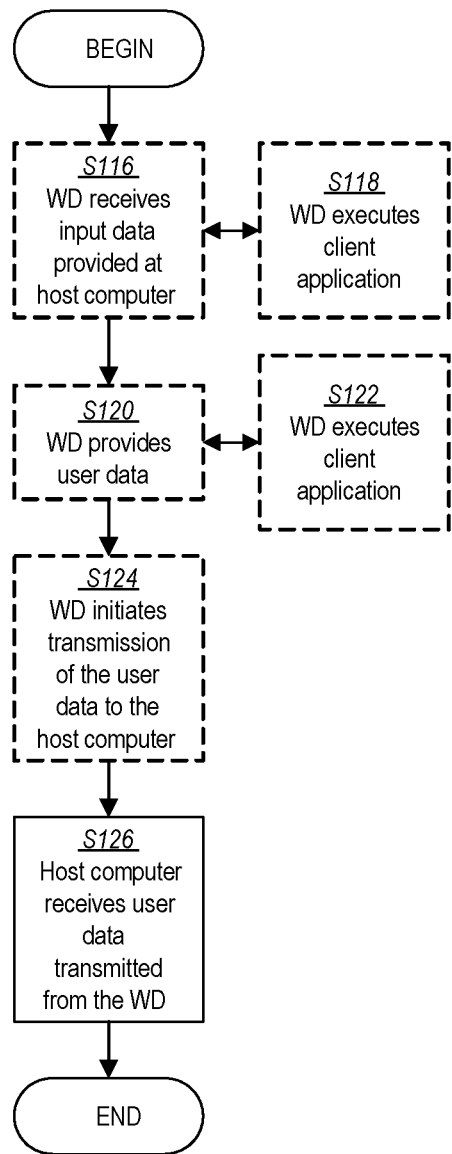
FIG. 7 is a flowchart illustrating an exemplary method implemented in a communication system including a host computer, a network node and a wireless device according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

Figure 8:
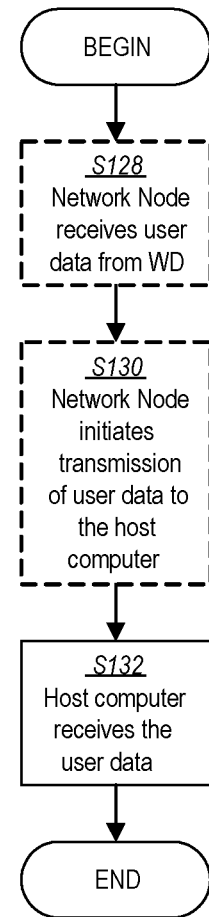
FIG. 8 is a flowchart illustrating an exemplary method implemented in a communication system including a host computer, a network node and a wireless device according to some embodiments of the present disclosure.

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 9:
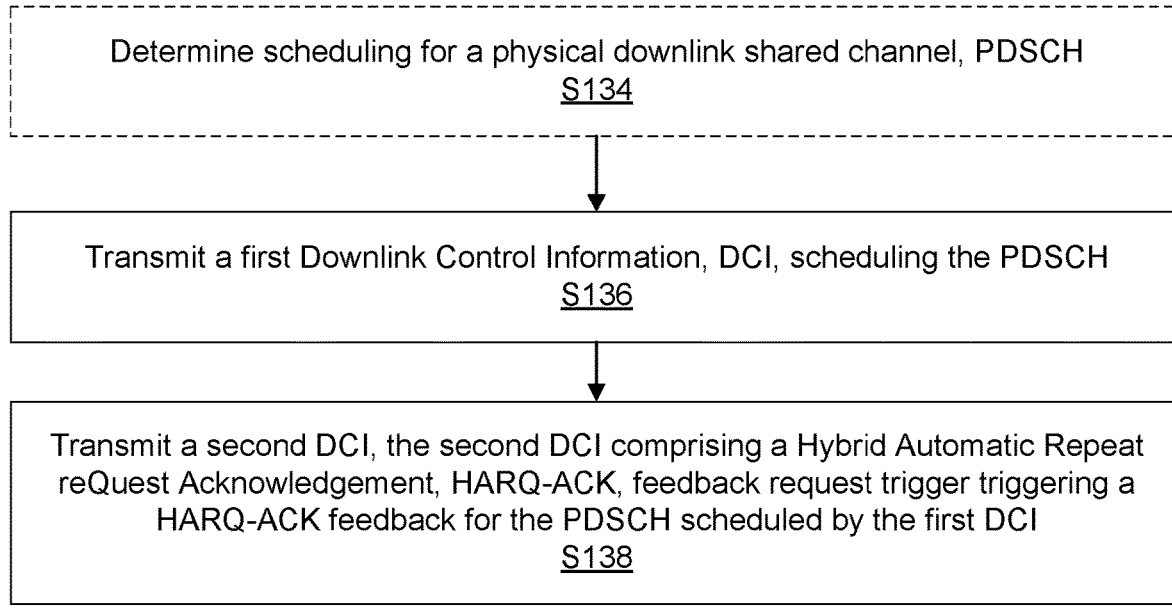
FIG. 9 is a flowchart of an exemplary process in a network node for HARQ according to some embodiments of the present disclosure.

FIG. 9 is a flowchart of an exemplary process in a network node 16. One or more Blocks and/or functions and/or methods performed by the network node 16 may be performed by one or more elements of network node 16 such as by feedback request unit 32 in processing circuitry 68, processor 70, radio interface 62, etc. according to the example method. In one embodiment, the example method comprises optionally, determining (block S134), such as via feedback request unit 32, processing circuitry 68, and/or radio interface 62, scheduling for a physical downlink shared channel, PDSCH. The method includes transmitting (block S136), such as via feedback request unit 32, processing circuitry 68, and/or radio interface 62, a first Downlink Control Information, DCI, scheduling the PDSCH. The method includes transmitting (block S138), such as via feedback request unit 32, processing circuitry 68, and/or radio interface 62, a second DCI, the second DCI comprising a Hybrid Automatic Repeat reQuest Acknowledgement, HARQ-ACK, feedback request trigger triggering a HARQ-ACK feedback for the PDSCH scheduled by the first DCI.

In some embodiments, the HARQ-ACK feedback request trigger comprises a bit map corresponding to the configured HARQ processes the network node 16 is requesting feedback for. In some embodiments, the method further comprises as a result of the HARQ-ACK feedback request trigger, receiving and decoding, such as via feedback request unit 32, processing circuitry 68, and/or radio interface 62, the HARQ-ACK feedback for the PDSCH scheduled by the first DCI. In some embodiments, the HARQ-ACK feedback request trigger is a field in the second DCI. In some embodiments, the transmitting the second DCI comprising the HARQ-ACK feedback request trigger is responsive to determining, such as via feedback request unit 32, processing circuitry 68, and/or radio interface 62, that an acknowledgement has not yet been received for at least a subset of the configured HARQ processes. In some embodiments, the HARQ-ACK feedback request trigger triggers HARQ-ACK feedback for all configured HARQ processes. In some embodiments, the HARQ-ACK feedback request trigger comprises at least one of: an indication of a time resource in which the network node expects the triggered HARQ-ACK feedback; an indication of a frequency resource on which the network node 16 expects the triggered HARQ-ACK feedback; and an indication of a carrier of which the network node expects the triggered HARQ-ACK feedback. In some embodiments, the transmitting the second DCI comprising the HARQ-ACK feedback request trigger further comprises transmitting, such as via feedback request unit 32, processing circuitry 68, and/or radio interface 62, the second DCI comprising at least two Downlink Assignment Indicator, DAI, values, a first DAI value assuming the HARQ-ACK feedback will be successfully decoded and a second DAI value assuming the HARQ-ACK feedback will not be successfully decoded. In some embodiments, the method further comprises, as a result of transmitting the HARQ-ACK feedback request trigger in the second DCI, receiving, such as via feedback request unit 32, processing circuitry 68, and/or radio interface 62, the HARQ-ACK feedback having a HARQ codebook size based at least in part on a value in a Downlink Assignment Indicator, DAI, field in the first DCI.

Figure 10:
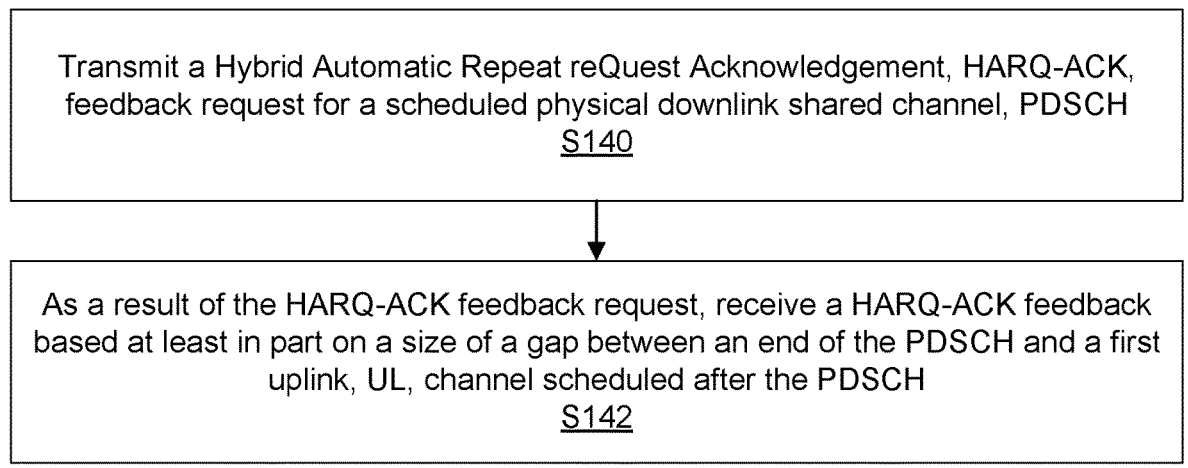
FIG. 10 is a flowchart of yet another exemplary process in a network node for HARQ according to some embodiments of the present disclosure.

FIG. 10 is a flowchart of yet another exemplary process in a network node 16. One or more Blocks and/or functions and/or methods performed by the network node 16 may be performed by one or more elements of network node 16 such as by feedback request unit 32 in processing circuitry 68, processor 70, radio interface 62, etc. according to the example method. In another embodiment, the example method includes transmitting (block S140), such as via feedback request unit 32, processing circuitry 68, and/or radio interface 62, a Hybrid Automatic Repeat reQuest Acknowledgement, HARQ-ACK, feedback request for a scheduled physical downlink shared channel, PDSCH. The method includes, as a result of the HARQ-ACK feedback request, receiving (block S142), such as via feedback request unit 32, processing circuitry 68, and/or radio interface 62, a HARQ-ACK feedback based at least in part on a size of a gap between an end of the PDSCH and a first uplink, UL, channel scheduled after the PDSCH.

In some embodiments, the receiving the HARQ-ACK feedback further comprises receiving, such as via feedback request unit 32, processing circuitry 68, and/or radio interface 62, the HARQ-ACK feedback within a same channel occupancy time, COT, as the PDSCH based at least in part on the size the gap. In some embodiments, the method further comprises transmitting, such as via feedback request unit 32, processing circuitry 68, and/or radio interface 62, to a wireless device, WD 22, a configuration of whether to perform a listen-before-talk, LBT, procedure before communicating the HARQ-ACK feedback. In some embodiments, the method further comprises scheduling, such as via feedback request unit 32, processing circuitry 68, and/or radio interface 62, at least one of at least one downlink transmission that is not associated with HARQ feedback and at least one uplink transmission within the gap. In some embodiments, the method further comprises configuring, such as via feedback request unit 32, processing circuitry 68, and/or radio interface 62, a wireless device, WD 22, to perform a listen-before-talk, LBT, procedure for a fixed duration. In some embodiments, the receiving the HARQ-ACK feedback further comprises receiving a HARQ codebook. In some embodiments, the receiving the HARQ-ACK feedback further comprises receiving, such as via feedback request unit 32, processing circuitry 68, and/or radio interface 62, the HARQ-ACK feedback according to a starting position of the HARQ-ACK feedback that is based at least in part on an outcome of a listen-before-talk, LBT, procedure. In some embodiments, the receiving the HARQ-ACK feedback further comprises receiving the HARQ-ACK feedback, such as via feedback request unit 32, processing circuitry 68, and/or radio interface 62, according to a starting position of the HARQ-ACK feedback that is marked by a presence of a Demodulation Reference Signal, DMRS, immediately preceding the HARQ feedback.

In another embodiment, an example process in a network node 16 comprises communicating, to the WD 22, an acknowledgement feedback request; indicating, to the WD 22, whether to perform a listen-before-talk (LBT) procedure before communicating an acknowledgement feedback response; and receiving, from the WD, the acknowledgement feedback response, as a result of the acknowledgement feedback request. In some embodiments, the method further includes performing, by the network node 16, an LBT procedure before communicating the acknowledgement feedback request to the WD 22. In some embodiments, the acknowledgement feedback request is for acknowledging receipt of downlink (DL) information communicated by the network node 16 on at least one DL channel. In some embodiments, the method further includes scheduling an Uplink (UL) channel for the WD 22 to include the acknowledgement feedback response and scheduling a gap between a most recent DL channel of the at least one DL channel and the scheduled UL channel. In some embodiments, the gap is scheduled for one or more transmissions that are not associated with HARQ. In some embodiments, the acknowledgement feedback request is an aggregate HARQ request to send a plurality of HARQ feedback responses corresponding to at least one of all and a subset of all configured HARQ processes. In some embodiments, the at least one downlink channel includes one or more Physical Downlink Shared Channels (PDSCHs). In some embodiments, the acknowledgement feedback request is communicated within an Uplink Control Information (UCI) message. In some embodiments, the acknowledgement feedback request is a Hybrid Automatic Repeat ReQuest (HARQ) request.

FIG. 11 is a flowchart of an exemplary method in a wireless device 22 according to some embodiments of the present disclosure. One or more Blocks and/or functions and/or methods performed by WD 22 may be performed by one or more elements of WD 22 such as by feedback unit 34 in processing circuitry 84, processor 86, radio interface 82, etc. The method includes receiving (block S144), such as via feedback unit 34, processing circuitry 84, and/or radio interface 82, from a network node 16, a first Downlink Control Information, DCI, scheduling a physical downlink shared channel, PDSCH. The method includes receiving (block S146), such as via feedback unit 34, processing circuitry 84, and/or radio interface 82, from the network node 16, a second DCI, the second DCI comprising a Hybrid Automatic Repeat reQuest Acknowledgement, HARQ-ACK, feedback request trigger triggering a HARQ-ACK feedback for the PDSCH scheduled by the first DCI. The method includes optionally, responsive to the HARQ-ACK feedback request trigger, transmitting (S147), such as via feedback unit 34, processing circuitry 84, and/or radio interface 82, the HARQ-ACK feedback for the PDSCH scheduled by the first DCI.

In some embodiments, the HARQ-ACK feedback request trigger comprises a bit map corresponding to the configured HARQ processes the network node is requesting feedback for. In some embodiments, the HARQ-ACK feedback request trigger triggers the HARQ-ACK feedback based at least in part on a value in a Downlink Assignment Indicator, DAI, field in the DCI scheduling the PDSCH. In some embodiments, the receiving the second DCI comprising the HARQ-ACK feedback request trigger further comprises receiving the HARQ-ACK feedback request trigger in a field in the second DCI. In some embodiments, the HARQ-ACK feedback request trigger triggers HARQ-ACK feedback for at least a subset of the configured HARQ processes, the at least the subset corresponding to the configured HARQ processes for which an acknowledgement has not yet been received by the network node. In some embodiments, the HARQ-ACK feedback request trigger triggers HARQ-ACK feedback for all configured HARQ processes. In some embodiments, the HARQ-ACK feedback request trigger comprises at least one of: an indication of a time resource in which the network node expects the triggered HARQ-ACK feedback; an indication of a frequency resource on which the network node expects the triggered HARQ-ACK feedback; and an indication of a carrier of which the network node expects the triggered HARQ-ACK feedback. In some embodiments, the second DCI further comprises at least two Downlink Assignment Indicator, DAI, values, a first DAI value assuming the HARQ-ACK feedback will be successfully decoded and a second DAI value assuming the HARQ-ACK feedback will not be successfully decoded. In some embodiments, the method further comprises responsive to receiving the HARQ-ACK feedback request trigger in the second DCI, determining, such as via feedback unit 34, processing circuitry 84, and/or radio interface 82, a HARQ codebook size based at least in part on a value in a Downlink Assignment Indicator, DAI, field in the first DCI. In some embodiments, the method further comprises performing, such as via feedback unit 34, processing circuitry 84, and/or radio interface 82, a listen-before-talk, LBT, procedure in order to transmit the HARQ-ACK feedback in an unlicensed spectrum; and determining, such as via feedback unit 34, processing circuitry 84, and/or radio interface 82, a HARQ codebook size based at least in part on an LBT success.

FIG. 12 is a flowchart of yet another exemplary method in a wireless device 22 according to some embodiments of the present disclosure. One or more Blocks and/or functions and/or methods performed by WD 22 may be performed by one or more elements of WD 22 such as by feedback unit 34 in processing circuitry 84, processor 86, radio interface 82, etc. The method includes receiving (block S148), such as via feedback unit 34, processing circuitry 84, and/or radio interface 82, a Hybrid Automatic Repeat reQuest Acknowledgement, HARQ-ACK, feedback request for a scheduled physical downlink shared channel, PDSCH. The method includes responsive to the received HARQ-ACK feedback request, communicating (block S150), such as via feedback unit 34, processing circuitry 84, and/or radio interface 82, a HARQ-ACK feedback based at least in part on a size of a gap between an end of the PDSCH and a first uplink, UL, channel scheduled after the PDSCH.

In some embodiments, the communicating the HARQ-ACK feedback further comprises communicating the HARQ-ACK feedback within a same channel occupancy time, COT, as the PDSCH based at least in part on the size the gap. In some embodiments, the communicating the HARQ-ACK feedback further comprises communicating, such as via feedback unit 34, processing circuitry 84, and/or radio interface 82, the HARQ-ACK feedback in an unlicensed spectrum without first performing a listen-before-talk, LBT, procedure based at least in part on the size the gap. In some embodiments, the method further comprises receiving, such as via feedback unit 34, processing circuitry 84, and/or radio interface 82, from the network node 16, a configuration of whether to perform a listen-before-talk, LBT, procedure before communicating the HARQ-ACK feedback. In some embodiments, the method further comprises if the size of the gap at most meets a gap size threshold, communicating the HARQ-ACK feedback in an unlicensed spectrum without first performing a listen-before-talk, LBT, procedure; and if the size of the gap exceeds the gap size threshold, communicating the HARQ-ACK feedback in the unlicensed spectrum after performing the LBT procedure. In some embodiments, the method further comprises receiving, from the network node 16, such as via feedback unit 34, processing circuitry 84, and/or radio interface 82, a configuration to perform a listen-before-talk, LBT, procedure for a fixed duration. In some embodiments, at least one of at least one downlink transmission that is not associated with HARQ feedback and at least one uplink transmission is scheduled within the gap. In some embodiments, the communicating the HARQ-ACK feedback further comprises communicating a HARQ codebook. In some embodiments, the communicating the HARQ-ACK feedback further comprises communicating, such as via feedback unit 34, processing circuitry 84, and/or radio interface 82, the HARQ-ACK feedback according to a starting position of the HARQ-ACK feedback that is based at least in part on an outcome of a listen-before-talk, LBT, procedure. In some embodiments, the communicating the HARQ-ACK feedback further comprises communicating, such as via feedback unit 34, processing circuitry 84, and/or radio interface 82, the HARQ-ACK feedback according to a starting position of the HARQ-ACK feedback that is marked by a presence of a Demodulation Reference Signal, DMRS, immediately preceding the HARQ feedback.

In yet another embodiment, the method includes receiving, from the network node 16, an acknowledgement feedback request; determining whether to perform a listen-before-talk (LBT) procedure before communicating an acknowledgement feedback response; and responsive to the received acknowledgement feedback request, communicating the acknowledgement feedback to the network node one of with and without performing the LBT procedure based on the determination. In some embodiments, the determination of whether to perform the LBT procedures includes interpreting a control signal or other communication from the network node 16 and, in other embodiments, the determination of whether to perform the LBT procedure is performed by the WD 22 independently from the network node 16. In other words, some embodiments of the disclosure are not limited to the signaling arrangement described in the disclosure and it is contemplated that the WD 22 can, in some aspects, make its own determination as to whether to perform the LBT procedure, for example, based on channel conditions, signaling from other devices, pre-configuration, etc. In some embodiments, determining whether to perform the LBT procedure comprises determining a size of a gap between a downlink (DL) channel and a first uplink (UL) channel scheduled after the DL channel. In some embodiments, the method further includes: if the size of the gap between the DL channel and the first UL channel at most meets a gap size threshold, determining not to perform the LBT procedure and communicating the acknowledgement feedback response by communicating the acknowledgement feedback response without performing the LBT procedure; and if the size of the gap between the DL channel and the first UL channel exceeds the gap size threshold, determining to perform the LBT procedure and performing the LBT procedure before communicating the acknowledgement feedback response. In some embodiments, the gap is scheduled for one or more transmissions that are not associated with HARQ. In some embodiments, the acknowledgement feedback request is an aggregate HARQ request to send a plurality of HARQ feedback responses; and based on the determination and responsive to the received aggregate HARQ request, communicating a plurality of HARQ feedback responses to the network node 16 one of with and without performing the LBT procedure, the plurality of HARQ feedback responses corresponding to at least one of all and a subset of all configured HARQ processes for the WD 22. In some embodiments, the acknowledgement feedback response is a Hybrid Automatic Repeat ReQuest (HARQ) response message. In some embodiments, the acknowledgement feedback request is received and the acknowledgement feedback response is communicated over an unlicensed spectrum.

Having generally described some embodiments for HARQ feedback design according to the present disclosure, a more detailed description of some of the embodiments, which may be implemented by the network node 16, wireless device 22 and/or host computer 24, will be described below.

Embodiment 1

Transmissions on unlicensed bands are generally subject to a listen-before-talk (LBT) procedure. Therefore, as noted above, there is uncertainty as to whether the transmission will be successfully completed depending on the LBT outcome. However, for short feedback transmission, similar to the ACK transmission in Wi-Fi, a short or no LBT is permitted. The same concept may be applied in the case of two nodes sharing the same transmit opportunity, i.e., the responding node may be permitted to skip LBT if the transmission starts within less than or equal to a predetermined time, e.g., 16 μs, from the end of the initiating node's transmission.

Therefore, in this embodiment, the network node 16 may initiate a transmit opportunity by performing a LBT procedure (e.g., a full exponential LBT procedure), and may request feedback (via e.g., PUCCH, or UCI), from e.g., the WD 22, for all or a subset of the PDSCH transmitted within the transmit opportunity. More specifically, in a further aspect, the feedback may include feedback for all or a subset of the PDSCH transmissions that precede the feedback transmission e.g., from the WD 22. In some aspects of this embodiment, multiple feedback occurrences may happen/be transmitted to the requesting node (e.g. network node 16) within one transmit opportunity. In some embodiments, feedback may be multiplexed with PUSCH transmissions.

In some embodiments, the term feedback may be used herein to indicate an acknowledgement feedback response (e.g., HARQ ACK/NACK message e.g., from WD 22). In some embodiments, the term feedback request or request may be used herein to indicate an acknowledgement feedback request (e.g., HARQ or aggregate HARQ feedback request e.g., from network node 16). In other embodiments, the feedback and feedback request may be associated with other types of feedback signals.

Figure 13:
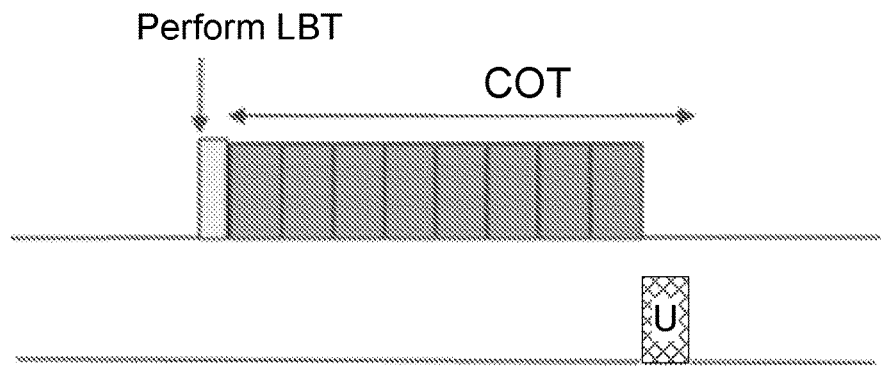
FIG. 13 illustrates an example of a shared channel occupancy with one switching point.
Figure 14:
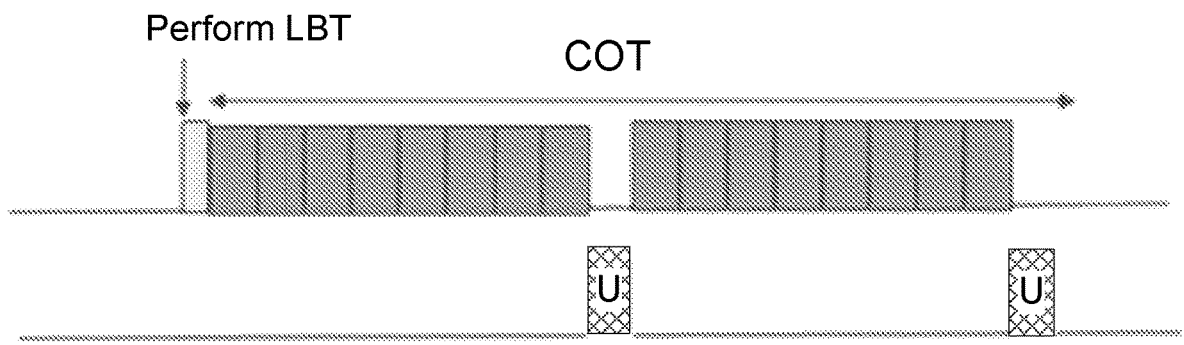
FIG. 14 illustrates a shared channel occupancy with multiple switching points.

The feedback may be sent without performing LBT at the WD 22 side if the gap between DL and the following UL transmission is sufficiently small (e.g., is less than and/or equal to a predetermined gap size threshold). As a non-limiting example, in one embodiment, the gap may be less than or equal to a predetermined amount, e.g., 16 μs. In other embodiments, the gap may be more than 16 μs. FIG. 13 shows an example of a shared channel occupancy with a channel occupancy time (COT) that is less than the maximum allowed COT (MCOT) with one switching point between DL and UL. FIG. 14 shows an example of shared COT with multiple switching points.

In some embodiments, the gap may be measured (by e.g., the WD 22 and/or the network node 16) between an end of the DL transmission and a beginning of the scheduled UL transmission. In some embodiments, the term gap is intended to indicate a predetermined time resource in which either no transmissions are schedule and/or one or more predetermined transmissions are scheduled (e.g., by network node 16) that may not be associated with an acknowledgement feedback response such as HARQ (so that, for example, LBT does not need to be performed by the WD 22).

As another aspect of this embodiment, if the gap between the DL transmission and the immediate next UL transmission is large (e.g., meets or exceeds a predetermined gap size threshold), the WD 22 may perform and/or be configured (e.g., by network node 16) to perform at least an LBT procedure for a fixed duration. As a non-limiting example, in one embodiment, the LBT duration may be a predetermined amount, e.g., 25 μs.

Embodiment 2

NR may support small processing delays, but not as small as providing feedback within the same time slot. For example, with a subcarrier spacing of 15 KHz, Layer 1 (L1) processing delay from the end of PDSCH until beginning of PUCCH is a minimum of 8 Orthogonal Frequency Division Multiplexing (OFDM) symbols, assuming a capability of 1 for a WD 22. Therefore, there may be an 8 OFDM symbol gap between the PDSCH reception (e.g., at the WD 22) and the corresponding feedback (e.g., from the WD 22).

Figure 15:
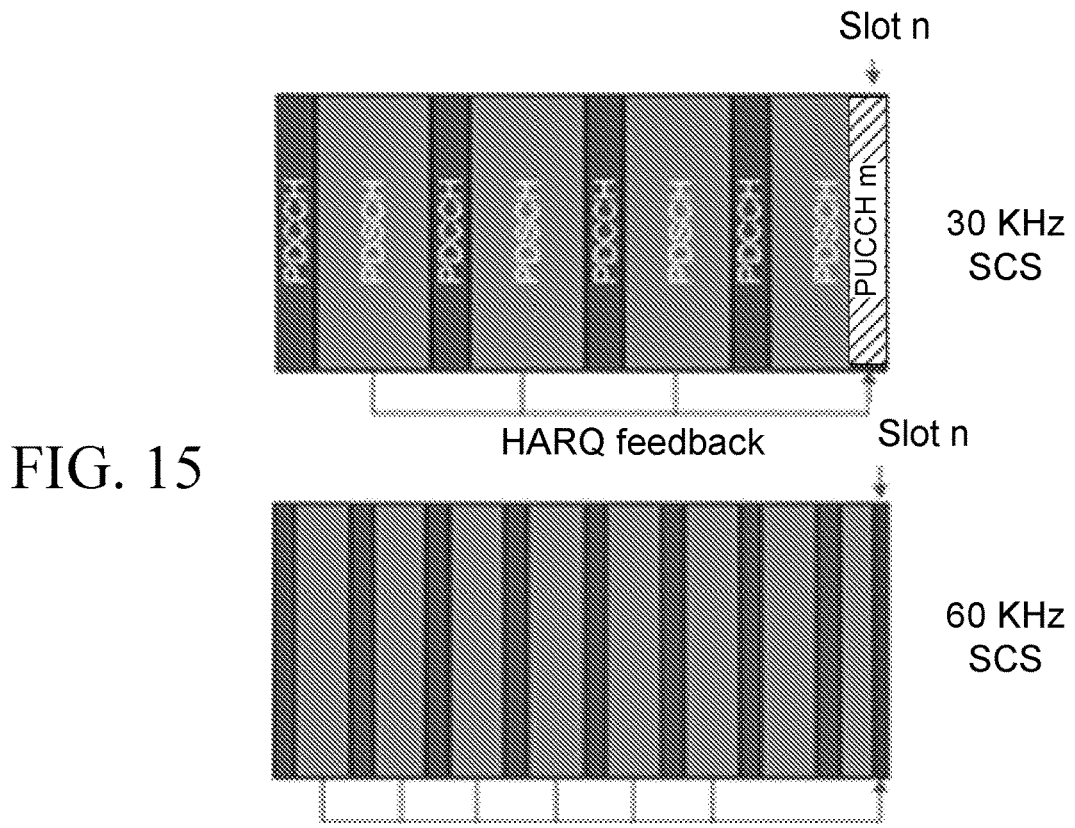
FIG. 15 illustrates an example in which feedback for slot n-½ cannot be included in the feedback provided in the same slot.

Accordingly, FIG. 15 shows an example where the feedback for PDSCH at slot n cannot be included in slot n if subcarrier spacing (SCS) 30 KHz is used. In the case of 60 KHz SCS, feedback for both PDSCHs at slot n and slot n-1 cannot be included.

Figure 16:
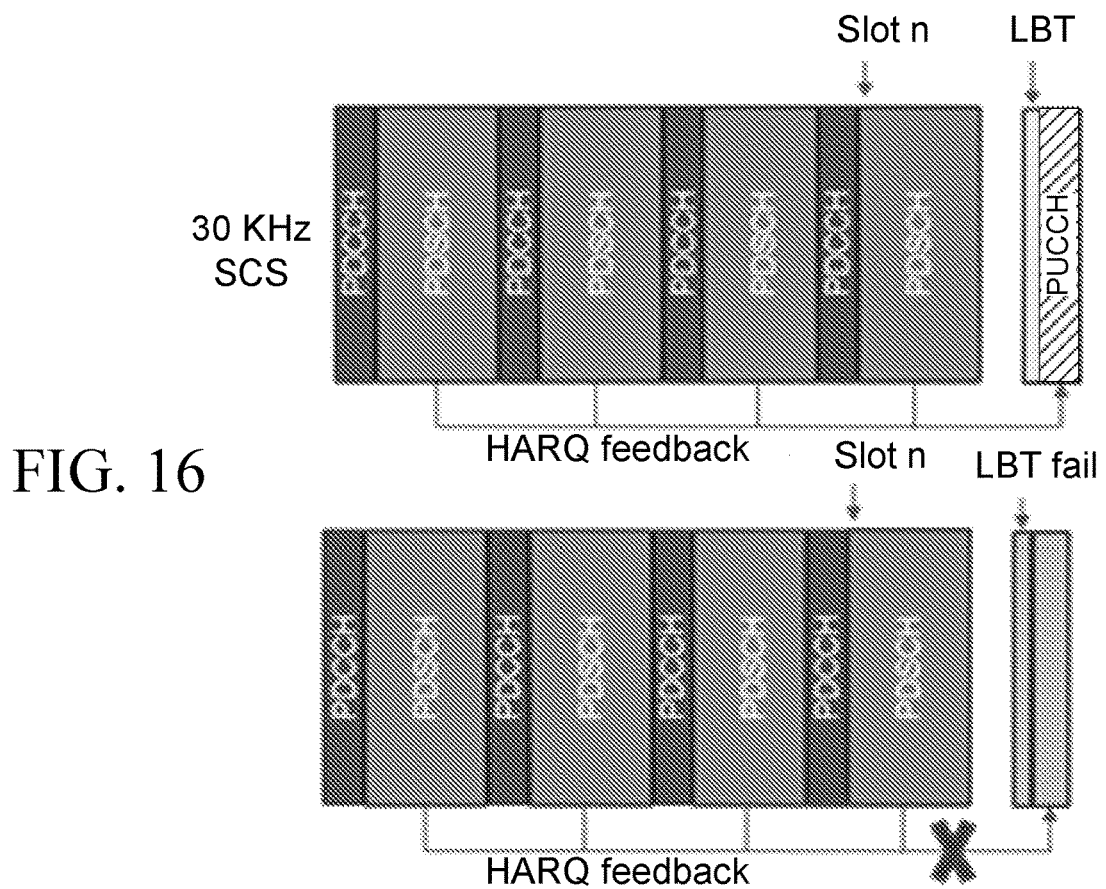
FIG. 16 illustrates an example in which feedback for slot n-1 can be included in the feedback provided in the same COT if a gap is introduced according to some embodiments of the present disclosure.

Alternatively, FIG. 16, shows an example where the feedback for PDSCH at slot n can be included if a gap to accommodate for the L1 processing delay is introduced. However, as explained earlier, if a gap is introduced, an LBT at the WD 22 may be required before accessing the channel to send the feedback. Therefore, the UL transmission would be subject to channel availability and therefore there would be a risk that the WD 22 fails to perform the transmission depending on the LBT outcome. If the WD 22 fails to transmit the feedback on the predefined slot, the network node 16 may have to assume NACK and retransmit all the PDSCH transmissions corresponding to slot n-3 to n.

It may be beneficial to maximize the chances that the feedback of all the transmissions within a certain transmit opportunity is self-contained within the same channel occupancy and not subject to LBT, while still fulfilling other requirements e.g., regulatory requirements. Lack of feedback, or delayed feedback can significantly impact the overall performance in terms of WD 22's throughput and also in terms of inefficient use of the wireless communication channel, particularly if the latter triggers unnecessary retransmissions. Even if multiple switching points within a COT is supported by the network (e.g., NR-U), there may still be some cases where the PDSCH(s) transmission immediately before the last scheduled PUCCH cannot be included unless a gap is introduced to accommodate for the L1 processing delay.

Figure 17:
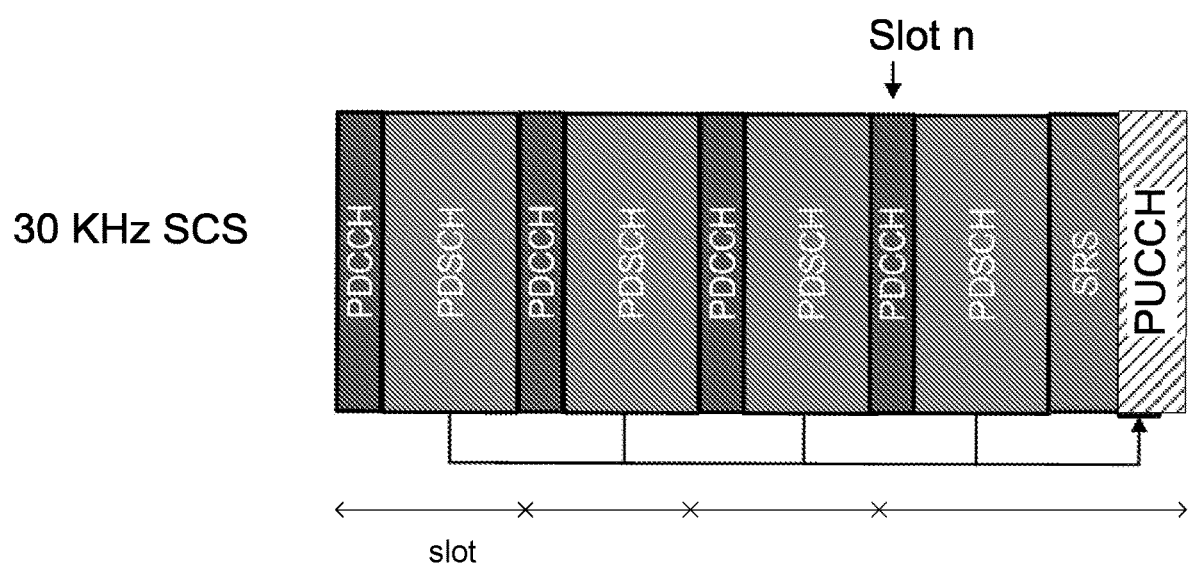
FIG. 17 illustrates an example of gap filling using SRS transmissions according to some embodiments of the present disclosure.

In some embodiments, to attempt to overcome the uncertainty caused by the LBT, the gap between the last (or immediately preceding) PDSCH transmission and the following feedback transmission can be filled with signals (other than PDSCH that requires HARQ feedback) so that the WD 22 can perform the UL transmission without an LBT. In other words, in some embodiments, signals or messages that do not require HARQ feedback may be communicated during the gap (so that, for example, another network device is not able to take over the channel thereby potentially requiring the WD 22 to perform an LBT procedure before communicating the feedback to the network node 16). FIG. 17 shows an example of such embodiment. As non-limiting examples, the gap can be filled with one or more of the following signals:

scheduled PUSCH transmissions
 DL/UL Demodulation Reference Signal (DMRS)
 UL DMRS
 Positioning Reference Signal (PRS) in either DL or UL
 Tracking Reference Signal (TRS) in either DL or UL
 Sounding Reference Signal (SRS): The SRS transmissions can be up to 4 symbols in length. For more than 4 symbols, multiple SRS resources can be configured
 PDCCH transmissions without any following PDSCH transmissions, e.g., DCI formats 2_1, 2_2, 2_3 or 2_4 or PDCCH orders activation/deactivation of configured grant transmissions
 PDSCH transmissions (following a PDCCH) that do not require or request any acknowledgements, e.g., system information or other broadcast information. Alternatively, PDSCH transmissions that have HARQ-ACK reporting instances at a later time/occasion.
 A partial OFDM symbol. This can include for example:
  Part of the last part of the subsequent OFDM symbol to effectively form a cyclic prefix for the transmissions in the next symbol.
  Parts of reference signals such as DMRS or SRS transmissions.
 Two PUCCH transmissions within the same slot that are following each other in time. The first PUCCH transmission may include HARQ-ACK reporting for some of the PDSCHs while the later one may include HARQ-ACK reporting for at least the last PDSCH (could also be more in other embodiments).
 The PUCCHs can either be long or short formats, e.g., either 1 to 2 OFDM symbols or 4 or longer.

Combinations of the above signals may also be used. For example, the time slot in the channel occupancy including a switch between downlink and uplink transmissions could include the following in sequence:

Four symbols of PDCCH/PDSCH/DMRS transmissions;
One to three symbols of PDCCH;
A predetermined gap, e.g., a gap of 16 microseconds (μs);
A partial OFDM symbol with SRS transmissions;
Four or more symbols of SRS; and
Up to two symbols of uplink control transmissions on PUCCH.

Embodiment 3

NR can provide the flexibility to include aggregate feedback corresponding to multiple HARQ processes in one PUCCH/UCI transmission. However, if the WD 22 fails to provide the aggregated feedback on the specified resources due to LBT failure, all PDSCHs associated with the failed feedback will be retransmitted e.g., by the network node 16 in existing networks (e.g., NR). Existing NR does not support the flexibility to ask for retransmission of the feedback.

In this embodiment, a new type of DL signaling is introduced for, for example NR-U or other networks operating in an unlicensed band, to enable a more flexible control for the PUCCH/UCI feedback.

Aspect 1:

In a first aspect of this third embodiment, the network node 16 can trigger the WD 22 to send feedback corresponding to all (or at least a subset of all greater than 1) configured HARQ processes. The trigger/indication for sending such feedback may be the time and frequency resources in which the network node 16 is expecting (or has scheduled transmission of) the feedback. The trigger/indication (e.g., from the network node 16 to the WD 22) may also include a carrier indication. In response to a trigger/indication, the WD 22 may send a fixed size feedback related to all (or at least a subset of all) configured HARQ processes. In one embodiment, the default value of the feedback is NACK, unless the WD 22 correctly received PDSCH corresponding to a certain HARQ process. As a non-limiting example:

One format for such trigger may be based on PDCCH. For example, this PDCCH may be addressed to a specific WD 22, or a group of WDs 22.

Such a trigger may be included, by for example the network node 16, in a DCI format 0_1 PDCCH scheduling an UL transmission by reusing the supplementary uplink (SUL) indicator field in DCI format 0_1. When, for example, this bit is set to 1 (by, for example, the network node 16), the WD 22 may, in response, include HARQ feedback for all (or at least a subset of all) configured processes in UCI in the UL transmission. The UCI may or may not be multiplexed with PUSCH transmissions.

Thus, in some embodiments, the trigger may be included as an indicator in DCI and the WD 22 may be configured to recognize such indicator and, responsive to such indicator, include HARQ feedback for all (or at least a subset of all) configured processes an UL transmission in for example UCI.

Aspect 2:

In another aspect of this embodiment, the network node 16 can trigger the WD 22 to send feedback corresponding to certain HARQ processes. The trigger may include all or a subset of the following:

A bit map of some or all the DL HARQ processes configured on that cell and a corresponding bit mapped to each process. For example, a bit corresponding to a certain HARQ process set to 1 indicates to the WD 22 to report the HARQ feedback of the associated HARQ process. The bitmap may also encompass the DL HARQ processes configured on multiple UL cells.

Time resources in which the network node 16 is expecting the UCI/PUCCH feedback.

Frequency resources on which the network node 16 is expecting the UCI/PUCCH feedback.

Carrier indication.

In some embodiments, the trigger is based on PDCCH. This PDCCH may be addressed to a specific WD 22, or a group of WDs 22.

Aspect 3:

In a third aspect of this embodiment, the network node 16 can trigger the WD 22 to send feedback corresponding to a DAI value included in DCI scheduling the PDSCH. For example, the trigger could be a separate DCI or only one field in legacy/existing DCI messages, e.g., one bit to indicate trigger feedback or not.

In the case of triggering feedback for all unacknowledged HARQ processes, the following embodiments may be performed at the network node 16 and WD 22 side, respectively:

the network node 16 may reset the DAI value to be, for example, one when the triggered feedback is successfully decoded; otherwise, the network node 16 may increase the DAI value by one. When the DAI value has reached a maximum DAI value, network node 16 stops scheduling data to wait for feedback;

responsive to the WD 22 detecting the trigger (e.g., dynamic trigger shown in FIG. 18), the WD 22 may check the latest DAI value to determine the HARQ codebook size.

Figure 18:
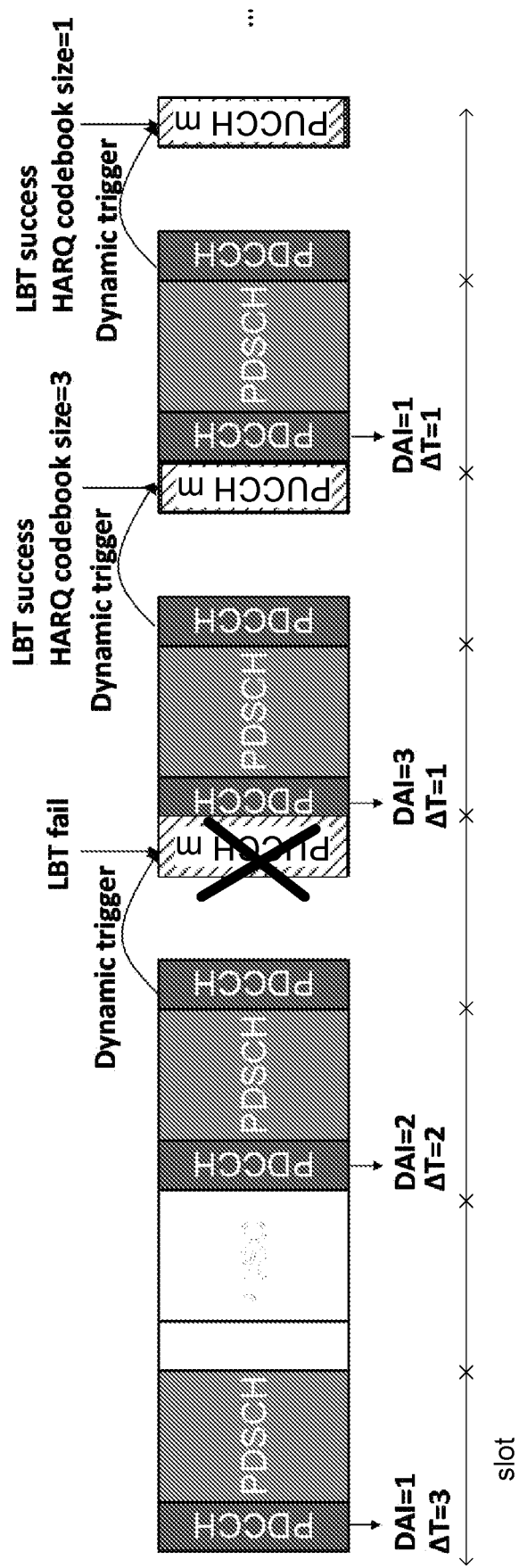
FIG. 18 illustrates triggered feedback by using DAI value to determine HARQ codebook size, with the trigger not in the same slot as PDSCH, according to some embodiments of the present disclosure.

One example is shown in FIG. 18. FIG. 18 illustrates triggered feedback by using DAI value to determine HARQ codebook size, with the trigger not in the same slot as PDSCH, according to some embodiments of the present disclosure. As can be seen in FIG. 18, the first dynamic trigger is in PDCCH in the 4$^{th}$ slot depicted (without PDSCH in the slot) but the LBT for the PUCCH fails. Thus, the next dynamic trigger is in PDCCH in the 6$^{th}$ slot depicted (without PDSCH in the slot) and since DAI=3 the HARQ codebook size is 3 (for each of the PDSCH for which HARQ has not yet been sent). In the 6$^{th}$ slot, LBT for the PUCCH is successful; thus, the DAI for the subsequent slot is reset to DAI=1 and the next dynamic trigger in PDCCH in the last slot depicted triggers HARQ codebook feedback size 1 (for the PDSCH in the previous slot) since DAI=1.

Figure 19:
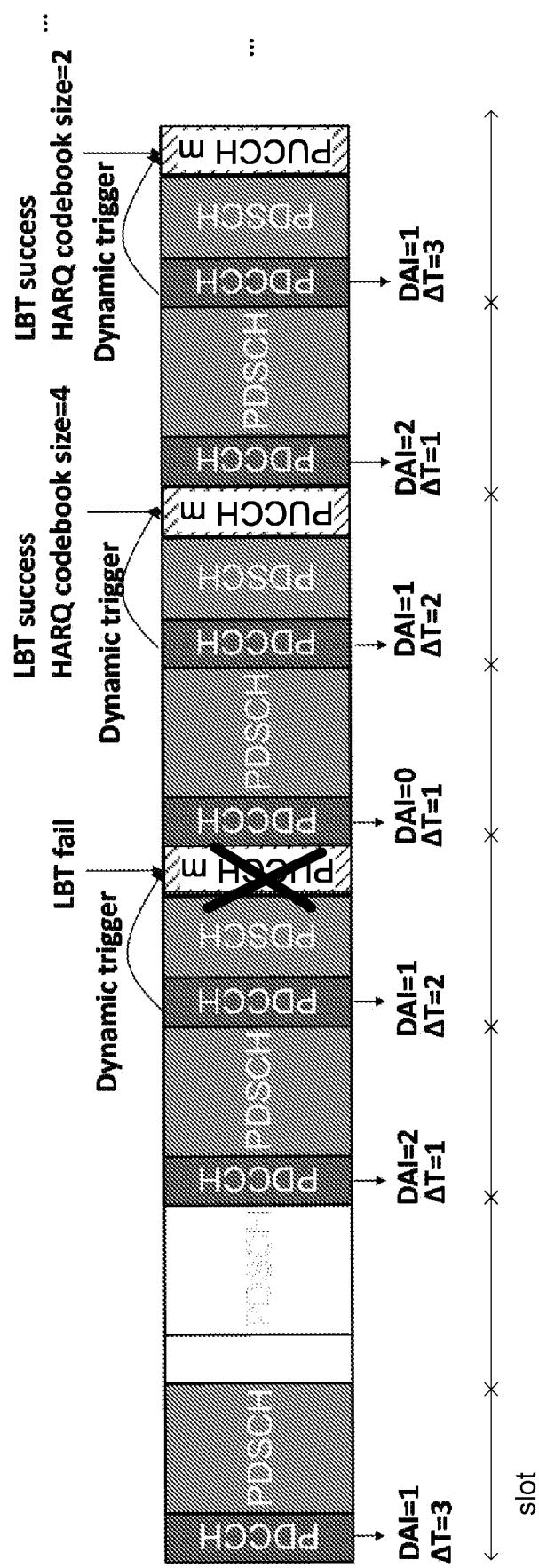
FIG. 19 illustrates triggered feedback by using DAI value to determine HARQ codebook size, with trigger allowed in the same slot as PDSCH, according to some embodiments of the present disclosure.

In the case of triggering feedback for all processes sent before the WD 22 receives the trigger (and/or that have not already been acknowledged by the WD 22), the following embodiments may be performed at the network node 16 and WD 22 side, respectively:

For the scheduled PDSCH within the same slot as the dynamic trigger (as shown in FIG. 19 for example in the 4$^{th}$, 6$^{th}$ and 8$^{th}$ slots depicted), the network node 16 may set two DAI values for such PDSCH: one value, e.g., $DAI_f$ is assuming that triggered feedback is not successfully decoded, i.e. increasing the $DAI_f$ by one/incrementing; the other value, $DAI_s$, is assuming that the triggered feedback is successfully decoded, e.g., reset $DAI_s$=0. For other scheduled PDSCH, the network node 16 may set the DAI value using existing techniques.

As a result of the WD 22 detecting the dynamic trigger, the WD 22 may check the latest DAI value in previous slots and determine the HARQ codebook size. For the PDSCH in the same slot as the trigger, WD 22 may determine the DAI value for such PDSCH by LBT status and the next DAI value if there is one. If LBT fails or the next DAI value is a large DAI value +1 (implying that triggered feedback is not decoded), the WD 22 may use such large DAI value; otherwise the WD 22 may use reset DAI value (e.g., 1). In some embodiments, the reset DAI value could even not be signaled, an example of which is depicted in FIG. 19, which illustrates triggered feedback by using DAI value to determine HARQ codebook size, with dynamic trigger allowed in the same slot as PDSCH, according to some embodiments of the present disclosure.

Embodiment 4

To enhance the chances that PUCCH feedback is transmitted within a certain slot, the starting position of the feedback transmission within a specific slot may depend on the LBT outcome. The feedback transmission may start at any or limited or predetermined positions within a slot. In some aspects, the start of the feedback transmission may be marked or determined by the presence of a predetermined signal, such as, for example, a DMRS, which may be followed immediately by the PUCCH feedback.

In addition, some embodiments may include one or more of the following: Embodiment A1. A wireless device (WD) configured to communicate with a network node, the WD configured to, and/or comprising a radio interface and/or processing circuitry configured to:

receive, from the network node, an acknowledgement feedback request;

determine whether to perform a listen-before-talk (LBT) procedure before communicating an acknowledgement feedback response; and responsive to the received acknowledgement feedback request, communicate the acknowledgement feedback response to the network node one of with and without performing the LBT procedure based on the determination.

Embodiment A2. The WD of Embodiment A1, wherein the processing circuitry is configured to determine whether to perform the LBT procedure by being further configured to determine a size of a gap between a downlink (DL) channel and a first uplink (UL) channel scheduled after the DL channel.

Embodiment A3. The WD of Embodiment A2, wherein the processing circuitry is configured to:

if the size of the gap between the DL channel and the first UL channel at most meets a gap size threshold, determining not to perform the LBT procedure and communicating the acknowledgement feedback response by communicating the acknowledgement feedback response without performing the LBT procedure; and if the size of the gap between the DL channel and the first UL channel exceeds the gap size threshold, determining to perform the LBT procedure and performing the LBT procedure before communicating the acknowledgement feedback response.

Embodiment A4. The WD of any of Embodiments A1 and A3, wherein the gap is scheduled for one or more transmissions that are not associated with HARQ.

Embodiment A5. The WD of any of Embodiments A1-A4, wherein the acknowledgement feedback request is an aggregate HARQ request to send a plurality of HARQ feedback responses; and based on the determination and responsive to the received aggregate HARQ request, communicate a plurality of HARQ feedback responses to the network node one of with and without performing the LBT procedure, the plurality of HARQ feedback responses corresponding to at least one of all and a subset of all configured HARQ processes for the WD.

Embodiment A6. The WD of any of Embodiments A1-A5, wherein the acknowledgement feedback response is a Hybrid Automatic Repeat ReQuest (HARQ) response message.

Embodiment A7. The WD of any of Embodiments A1-A6, wherein the acknowledgement feedback request is received and the acknowledgement feedback response is communicated over an unlicensed spectrum.

Embodiment B1. A method implemented in a wireless device (WD), the method comprising:

receiving, from the network node, an acknowledgement feedback request;

determining whether to perform a listen-before-talk (LBT) procedure before communicating an acknowledgement feedback response; and responsive to the received acknowledgement feedback request, communicating the acknowledgement feedback to the network node one of with and without performing the LBT procedure based on the determination.

Embodiment B2. The method of Embodiment B1, wherein determining whether to perform the LBT procedure comprises determining a size of a gap between a downlink (DL) channel and a first uplink (UL) channel scheduled after the DL channel.

Embodiment B3. The method of Embodiment B2, further comprising:

if the size of the gap between the DL channel and the first UL channel at most meets a gap size threshold, determining not to perform the LBT procedure and communicating the acknowledgement feedback response by communicating the acknowledgement feedback response without performing the LBT procedure; and if the size of the gap between the DL channel and the first UL channel exceeds the gap size threshold, determining to perform the LBT procedure and performing the LBT procedure before communicating the acknowledgement feedback response.

Embodiment B4. The method of any of Embodiments B1 and B3, wherein the gap is scheduled for one or more transmissions that are not associated with HARQ.

Embodiment B5. The method of any of Embodiments B1-B4, wherein the acknowledgement feedback request is an aggregate HARQ request to send a plurality of HARQ feedback responses; and based on the determination and responsive to the received aggregate HARQ request, communicating a plurality of HARQ feedback responses to the network node one of with and without performing the LBT procedure, the plurality of HARQ feedback responses corresponding to at least one of all and a subset of all configured HARQ processes for the WD.

Embodiment B6. The method of any of Embodiments B1-B5, wherein the acknowledgement feedback response is a Hybrid Automatic Repeat ReQuest (HARQ) response message.

Embodiment B7. The method of any of Embodiments B1-B6, wherein the acknowledgement feedback request is received and the acknowledgement feedback response is communicated over an unlicensed spectrum.

Embodiment C1. A network node configured to communicate with a wireless device (WD), the network node configured to, and/or comprising a radio interface and/or comprising processing circuitry configured to:

communicate, to the WD, an acknowledgement feedback request;

indicate, to the WD, whether to perform a listen-before-talk (LBT) procedure before communicating an acknowledgement feedback response; and receive, from the WD, the acknowledgement feedback response, as a result of the acknowledgement feedback request.

Embodiment C2. The network node of Embodiment C1, wherein the processing circuitry is further configured to perform an LBT procedure before communicating the acknowledgement feedback request to the WD.

Embodiment C3. The network node of any of Embodiments C1 and C2, wherein the acknowledgement feedback request is for acknowledging receipt of downlink (DL) information communicated by the network node on at least one DL channel.

Embodiment C4. The network node of Embodiment C3, wherein the processing circuitry is further configured to schedule an uplink (UL) channel for the WD to include the acknowledgement feedback response and to schedule a gap between a most recent DL channel of the at least one DL channel and the scheduled UL channel.

Embodiment C5. The network node of Embodiment C4, wherein the gap is scheduled for one or more transmissions that are not associated with HARQ.

Embodiment C6. The network node of any of Embodiments C1-C5, wherein the acknowledgement feedback request is an aggregate HARQ request to send a plurality of HARQ feedback responses corresponding to at least one of all and a subset of all configured HARQ processes.

Embodiment C7. The network node of any of Embodiments C3-C6, wherein the at least one downlink channel includes one or more Physical Downlink Shared Channels (PDSCH).

Embodiment C8. The network node of any of Embodiments C1-C7, wherein the acknowledgement feedback request is communicated within an Uplink Control Information (UCI) message.

Embodiment C9. The network node of any of Embodiments C1-C8, wherein the acknowledgement feedback request is a Hybrid Automatic Repeat ReQuest (HARQ) request.

Embodiment D1. A method implemented in a network node, the method comprising: communicating, to the WD, an acknowledgement feedback request;

indicating, to the WD, whether to perform a listen-before-talk (LBT) procedure before communicating an acknowledgement feedback response; and receiving, from the WD, the acknowledgement feedback response, as a result of the acknowledgement feedback request.

Embodiment D2. The method of Embodiment D1, further comprising performing, by the network node, an LBT procedure before communicating the acknowledgement feedback request to the WD.

Embodiment D3. The method of any of Embodiments D1 and D2, wherein the acknowledgement feedback request is for acknowledging receipt of downlink (DL) information communicated by the network node on at least one DL channel.

Embodiment D4. The method of Embodiment D3, further comprising scheduling an uplink (UL) channel for the WD to include the acknowledgement feedback response and scheduling a gap between a most recent DL channel of the at least one DL channel and the scheduled UL channel.

Embodiment D5. The method of Embodiment D4, wherein the gap is scheduled for one or more transmissions that are not associated with HARQ.

Embodiment D6. The method of any of Embodiments D1-D5, wherein the acknowledgement feedback request is an aggregate HARQ request to send a plurality of HARQ feedback responses corresponding to at least one of all and a subset of all configured HARQ processes.

Embodiment D7. The method of any of Embodiments D3-D6, wherein the at least one downlink channel includes one or more Physical Downlink Shared Channels (PDSCHs).

Embodiment D8. The method of any of Embodiments D1-D7, wherein the acknowledgement feedback request is communicated within an Uplink Control Information (UCI) message.

Embodiment D9. The method of any of Embodiments D1-D8, wherein the acknowledgement feedback request is a Hybrid Automatic Repeat ReQuest (HARQ) request.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
ACK/NACK Acknowledgment/Not-acknowledgment
CSI Channel State Information
COT Channel occupancy time
DCI Downlink Control Information
DFTS-OFDM Discrete Fourier Transform Spread OFDM
DM-RS Demodulation Reference Signal
LBT Listen before talk
TRS Tracking reference symbol
PRS Paging reference symbol It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
receiving, from a network node, a first Downlink Control Information, DCI, scheduling a physical downlink shared channel, PDSCH;
receiving, from the network node, a second DCI, the second DCI comprising:
a Hybrid Automatic Repeat reQuest Acknowledgement, HARQ-ACK, feedback request trigger triggering a HARQ-ACK feedback for the PDSCH scheduled by the first DCI; and
at least two Downlink Assignment Indicator, DAI, values, a first DAI value assuming the HARQ-ACK feedback will be successfully decoded, and a second DAI value assuming the HARQ-ACK feedback will not be successfully decoded; and
responsive to the HARQ-ACK feedback request trigger, transmitting the HARQ-ACK feedback for the PDSCH scheduled by the first DCI.

2. The method of claim 1, wherein the HARQ-ACK feedback request trigger comprises a bit map corresponding to the configured HARQ processes the network node is requesting feedback for.

3. The method of claim 1, wherein the receiving the second DCI comprising the HARQ-ACK feedback request trigger further comprises receiving the HARQ-ACK feedback request trigger in a field in the second DCI.

4. The method of claim 1, wherein the HARQ-ACK feedback request trigger triggers HARQ-ACK feedback for at least a subset of configured HARQ processes, the at least the subset corresponding to the configured HARQ processes for which an acknowledgement has not yet been received by the network node.

5. The method of claim 1, wherein the HARQ-ACK feedback request trigger triggers HARQ-ACK feedback for all configured HARQ processes.

6. The method of claim 1, wherein the HARQ-ACK feedback request trigger comprises at least one of:
an indication of a time resource in which the network node expects the triggered HARQ-ACK feedback;
an indication of a frequency resource on which the network node expects the triggered HARQ-ACK feedback; and
an indication of a carrier of which the network node expects the triggered HARQ-ACK feedback.

7. The method of claim 1, further comprising:
responsive to receiving the HARQ-ACK feedback request trigger in the second DCI, determining a HARQ codebook size based at least in part on a value in a Downlink Assignment Indicator, DAI, field in the first DCI.

8. The method of claim 1, further comprising:
performing a listen-before-talk, LBT, procedure in order to transmit the HARQ-ACK feedback in an unlicensed spectrum; and
determining a HARQ codebook size based at least in part on an LBT success.

9. The method of claim 1, wherein the HARQ-ACK feedback request trigger triggers the HARQ-ACK feedback based at least in part on a value in a Downlink Assignment Indicator, DAI, field in the first DCI scheduling the PDSCH.

10. A method implemented in a network node, the method comprising:
determining scheduling for a physical downlink shared channel, PDSCH;
transmitting a first Downlink Control Information, DCI, scheduling the PDSCH; and transmitting a second DCI, the second DCI comprising:
  a Hybrid Automatic Repeat reQuest Acknowledgement, HARQ-ACK, feedback request trigger triggering a HARQ-ACK feedback for the PDSCH scheduled by the first DCI; and
  at least two Downlink Assignment Indicator, DAI, values, a first DAI value assuming the HARQ-ACK feedback will be successfully decoded, and a second DAI value assuming the HARQ-ACK feedback will not be successfully decoded.

11. The method of claim 10, wherein the HARQ-ACK feedback request trigger comprises a bit map corresponding to configured HARQ processes the network node is requesting feedback for.

12. The method of claim 10, wherein the HARQ-ACK feedback request trigger is a field in the second DCI.

13. The method of claim 10, wherein the transmitting the second DCI comprising the HARQ-ACK feedback request trigger is responsive to determining that an acknowledgement has not yet been received for at least a subset of configured HARQ processes.

14. The method of claim 10, wherein the HARQ-ACK feedback request trigger triggers HARQ-ACK feedback for all configured HARQ processes.

15. The method of claim 10, wherein the HARQ-ACK feedback request trigger comprises at least one of:
  an indication of a time resource in which the network node expects the triggered HARQ-ACK feedback;
  an indication of a frequency resource on which the network node expects the triggered HARQ-ACK feedback; and
  an indication of a carrier of which the network node expects the triggered HARQ-ACK feedback.

16. The method of claim 10, further comprising:
  as a result of transmitting the HARQ-ACK feedback request trigger in the second DCI, receiving the HARQ-ACK feedback having a HARQ codebook size based at least in part on a value in a Downlink Assignment Indicator, DAI, field in the first DCI.

17. A wireless device, WD, configured to communicate with a network node, the WD comprising a radio interface and processing circuitry in communication with the radio interface, the processing circuitry configured to cause the radio interface to:
  receive, from a network node, a first Downlink Control Information, DCI, scheduling a physical downlink shared channel, PDSCH;
  receive, from the network node, a second DCI, the second DCI comprising:
    a Hybrid Automatic Repeat reQuest Acknowledgement, HARQ-ACK, feedback request trigger triggering a HARQ-ACK feedback for the PDSCH scheduled by the first DCI; and
    at least two Downlink Assignment Indicator, DAI, values, a first DAI value assuming the HARQ-ACK feedback will be successfully decoded, and a second DAI value assuming the HARQ-ACK feedback will not be successfully decoded; and
  responsive to the HARQ-ACK feedback request trigger, transmit the HARQ-ACK feedback for the PDSCH scheduled by the first DCI.

18. The WD of claim 17, wherein the HARQ-ACK feedback request trigger comprises a bit map corresponding to configured HARQ processes the network node is requesting feedback for.

19. The WD of claim 17, wherein the processing circuitry is further configured to cause the radio interface to receive the second DCI comprising the HARQ-ACK feedback request trigger by being configured to cause the radio interface to:
  receive the HARQ-ACK feedback request trigger in a field in the second DCI.

20. The WD of claim 17, wherein the HARQ-ACK feedback request trigger triggers HARQ-ACK feedback for at least a subset of configured HARQ processes, the at least the subset corresponding to the configured HARQ processes for which an acknowledgement has not yet been received by the network node.

21. The WD of claim 17, wherein the HARQ-ACK feedback request trigger triggers HARQ-ACK feedback for all configured HARQ processes.

22. The WD of claim 17, wherein the HARQ-ACK feedback request trigger comprises at least one of:
  an indication of a time resource in which the network node expects the triggered HARQ-ACK feedback;
  an indication of a frequency resource on which the network node expects the triggered HARQ-ACK feedback; and
  an indication of a carrier of which the network node expects the triggered HARQ-ACK feedback.

23. A network node configured to communicate with a wireless device, WD, the network node comprising a radio interface and processing circuitry in communication with the radio interface, the processing circuitry configured to:
  determine scheduling for a physical downlink shared channel, PDSCH;
  cause the radio interface to transmit a first Downlink Control Information, DCI, scheduling the PDSCH; and
  cause the radio interface to transmit a second DCI, the second DCI comprising:
    a Hybrid Automatic Repeat reQuest Acknowledgement, HARQ-ACK, feedback request trigger triggering a HARQ-ACK feedback for the PDSCH scheduled by the first DCI; and
    at least two Downlink Assignment Indicator, DAI, values, a first DAI value assuming the HARQ-ACK feedback will be successfully decoded, and a second DAI value assuming the HARQ-ACK feedback will not be successfully decoded.

* * * * *